United States Patent
Iwaki et al.

(10) Patent No.: US 10,497,082 B2
(45) Date of Patent: Dec. 3, 2019

(54) INFORMATION PROCESSING DEVICE

(71) Applicant: Semiconductor Energy Laboratory Co., Ltd., Kanagawa-ken (JP)

(72) Inventors: Yuji Iwaki, Kanagawa (JP); Katsuki Yanagawa, Kanagawa (JP)

(73) Assignee: Semiconductor Energy Laboratory Co., Ltd. (JP)

(*) Notice: Subject to any disclaimer, the term of this patent is extended or adjusted under 35 U.S.C. 154(b) by 849 days.

(21) Appl. No.: 14/702,173

(22) Filed: May 1, 2015

(65) Prior Publication Data

US 2015/0317265 A1 Nov. 5, 2015

(30) Foreign Application Priority Data

May 2, 2014 (JP) .................................. 2014-095195

(51) Int. Cl.
| | | |
|---|---|---|
| *G06F 3/147* | (2006.01) | |
| *G06T 1/20* | (2006.01) | |
| *G06F 13/24* | (2006.01) | |
| *G06F 13/42* | (2006.01) | |

(52) U.S. Cl.
CPC .............. *G06T 1/20* (2013.01); *G06F 13/24* (2013.01); *G06F 13/4221* (2013.01); *G06F 3/147* (2013.01); *G09G 2380/02* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| | | | |
|---|---|---|---|
| 8,432,372 B2 | 4/2013 | Butler et al. | |
| 8,831,285 B2 | 9/2014 | Kang | |
| 9,189,865 B2 | 11/2015 | Hasegawa et al. | |
| 2008/0158169 A1 | 7/2008 | O'Connor et al. | |
| 2009/0135158 A1* | 5/2009 | Takahashi | G06F 3/0416 345/174 |
| 2010/0214236 A1* | 8/2010 | Kim | G06F 3/0412 345/173 |
| 2011/0261007 A1 | 10/2011 | Joharapurkar et al. | |
| 2012/0217516 A1 | 8/2012 | Hatano et al. | |
| 2013/0194223 A1* | 8/2013 | Ward | G06F 1/3262 345/174 |
| 2013/0307825 A1* | 11/2013 | Czelnik | B60K 35/00 345/174 |

(Continued)

FOREIGN PATENT DOCUMENTS

| | | |
|---|---|---|
| JP | 09-325854 A | 12/1997 |
| JP | 2011-118533 A | 6/2011 |

(Continued)

*Primary Examiner* — Jiangeng Sun
(74) *Attorney, Agent, or Firm* — Husch Blackwell LLP

(57) ABSTRACT

A novel information processing device that is highly convenient or reliable is provided. Alternatively, a novel information processing device is provided. The novel information processing device includes an input portion supplying a map and a memory portion storing a program. The program includes interrupt processing in which a data set is generated from the map, a step of extracting a pattern from the data set generated through the interrupt processing, and a step of supplying instructions associated with a reference table when the extracted pattern is included in the reference table.

12 Claims, 13 Drawing Sheets

(56) References Cited

U.S. PATENT DOCUMENTS

2014/0204285 A1* 7/2014 Jang .................. G06F 3/044
  349/12
2014/0362052 A1   12/2014 McCaughan et al.

FOREIGN PATENT DOCUMENTS

| JP | 2012-190794 | 10/2012 |
| JP | 2014-063265 A | 4/2014 |

* cited by examiner

FIG. 3A1
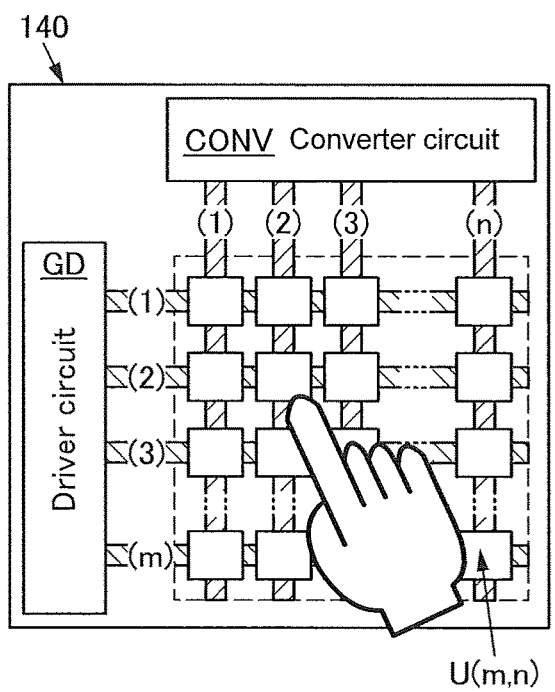
FIG. 3A2
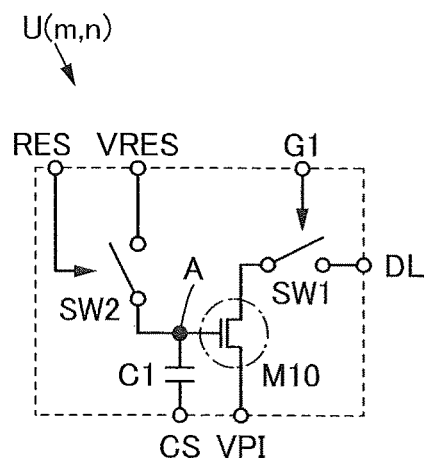
FIG. 3B
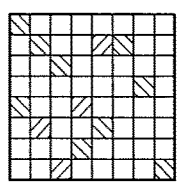
FIG. 3C1
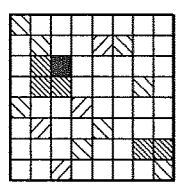
FIG. 3D1
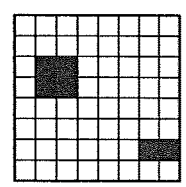
FIG. 3C2
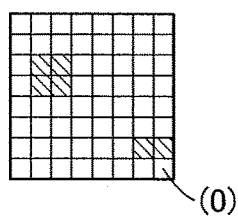
FIG. 3D2
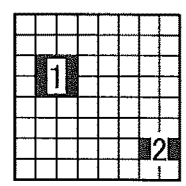
FIG. 3C3
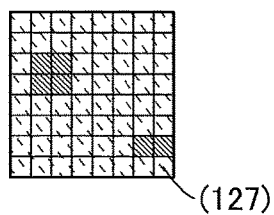

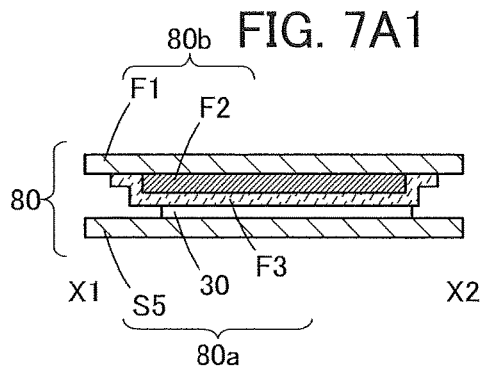
FIG. 7A1
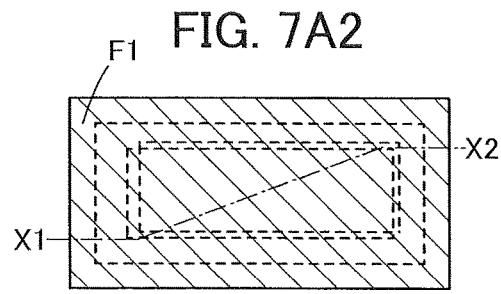
FIG. 7A2
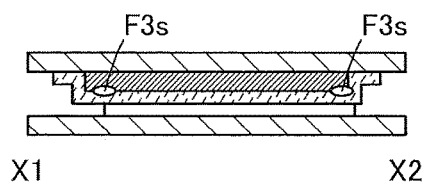
FIG. 7B1
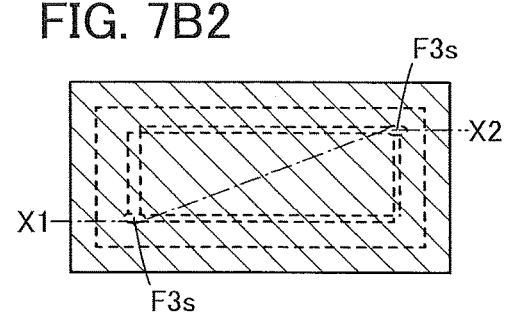
FIG. 7B2
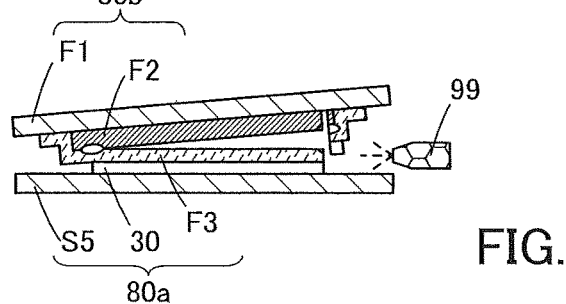
FIG. 7C
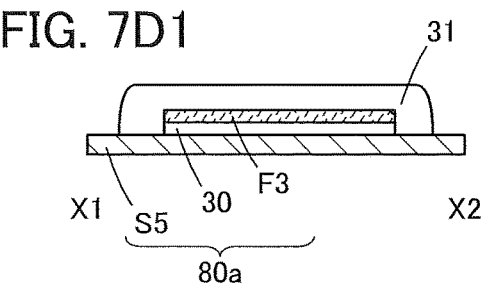
FIG. 7D1
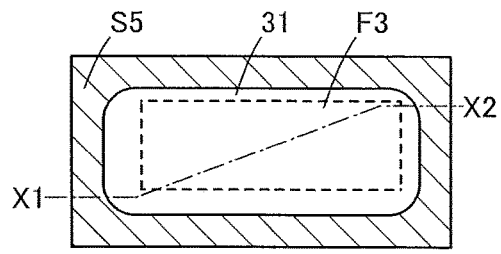
FIG. 7D2
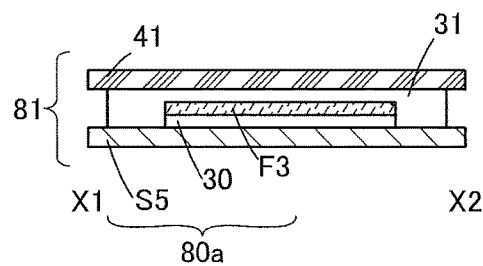
FIG. 7E1
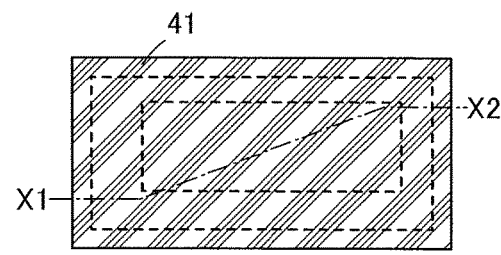
FIG. 7E2

FIG. 8A1 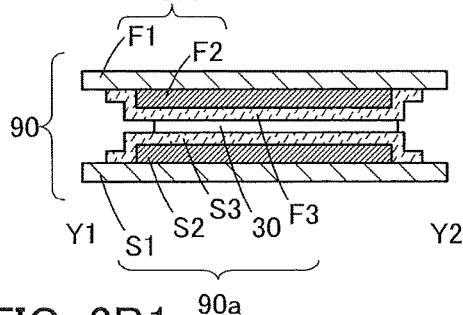 FIG. 8A2 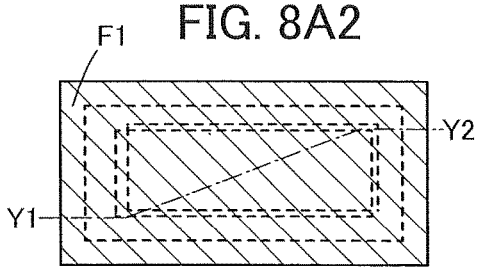
FIG. 8B1 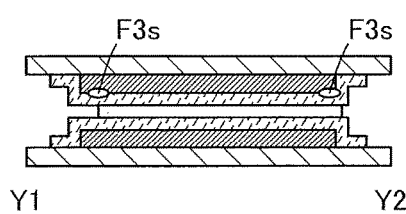 FIG. 8B2 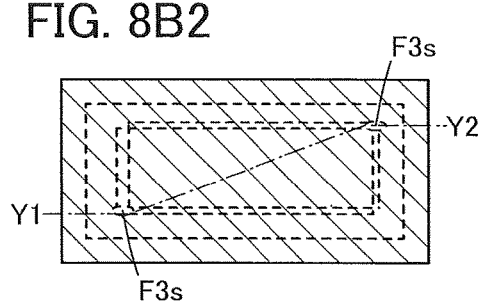

FIG. 8D1 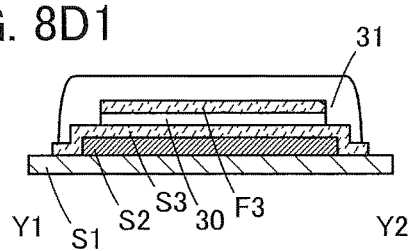 FIG. 8D2 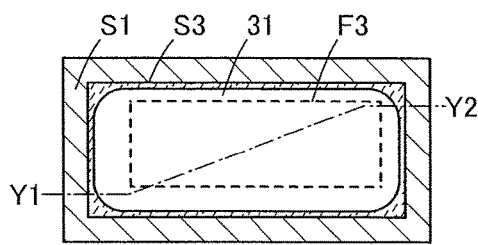
FIG. 8E1 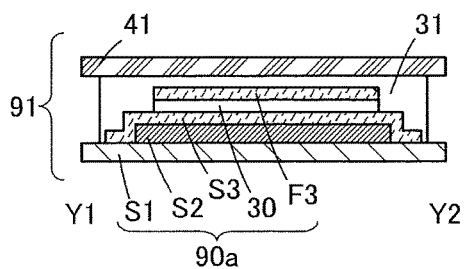 FIG. 8E2 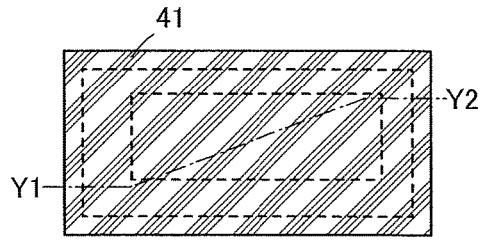

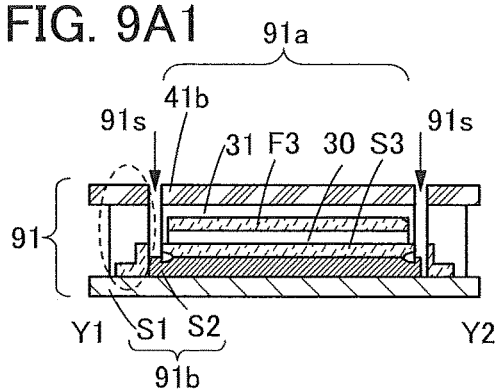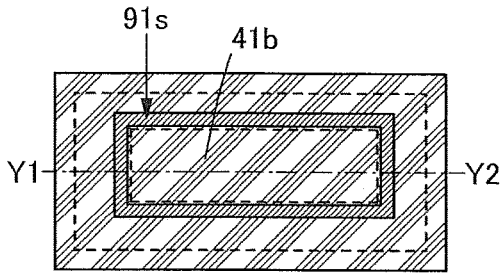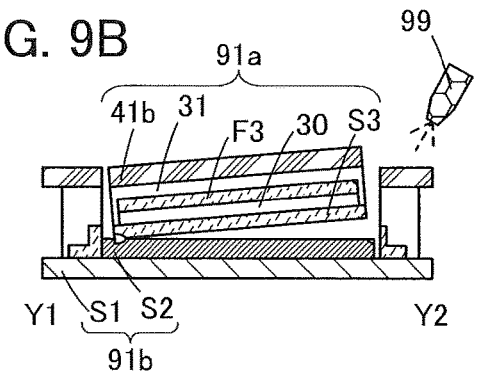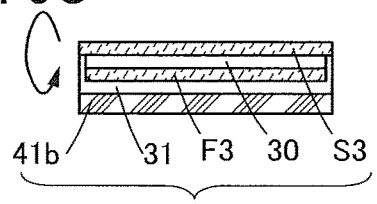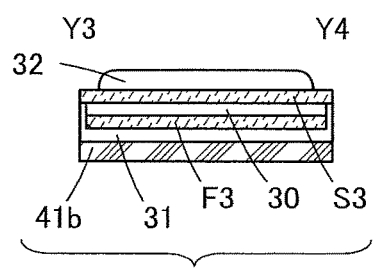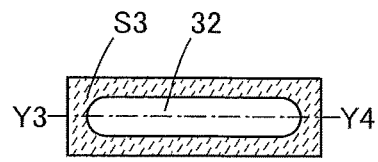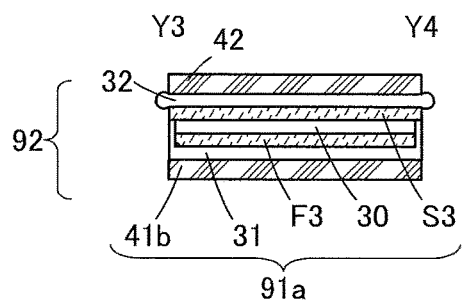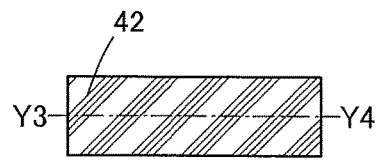

FIG. 10A1
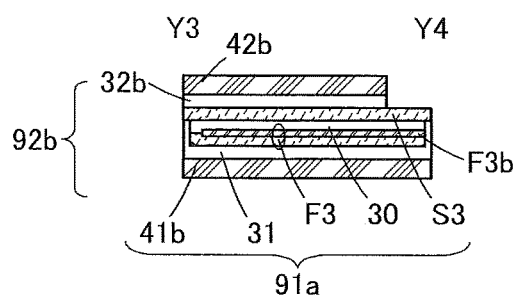
FIG. 10A2
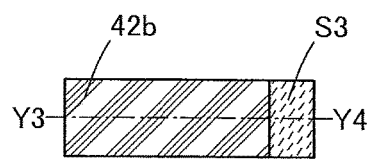
FIG. 10B1
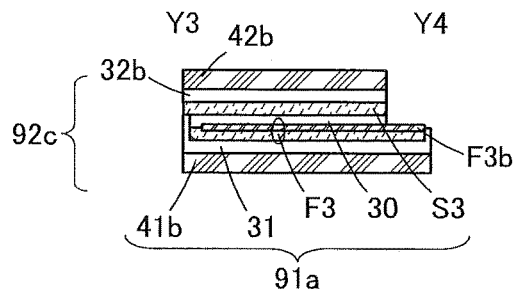
FIG. 10B2
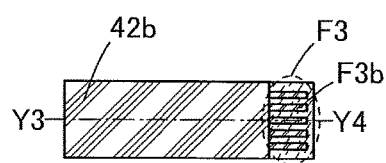
FIG. 10C1
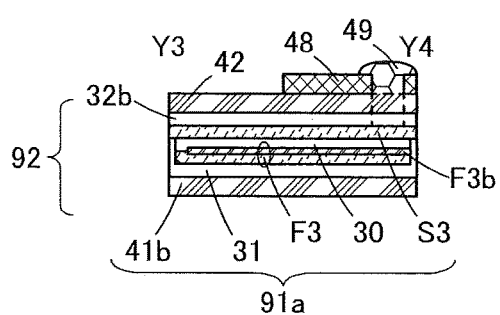
FIG. 10C2
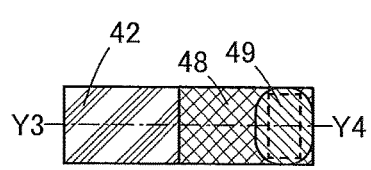
FIG. 10D1
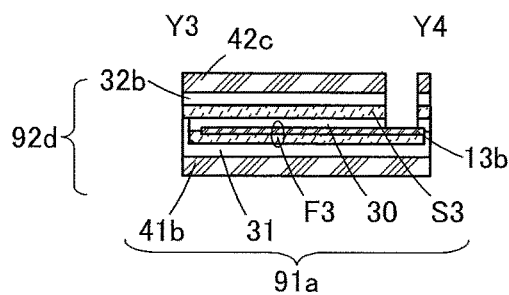
FIG. 10D2
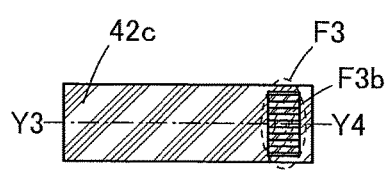

FIG. 11A1
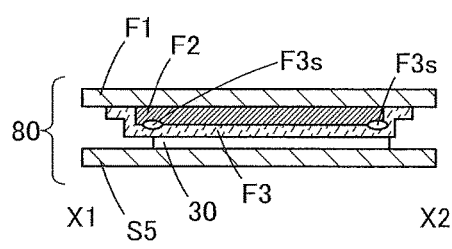
FIG. 11A2
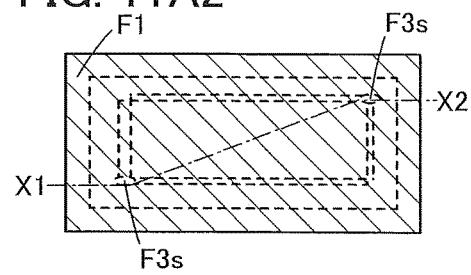
FIG. 11B1
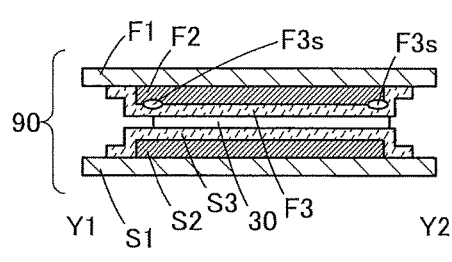
FIG. 11B2
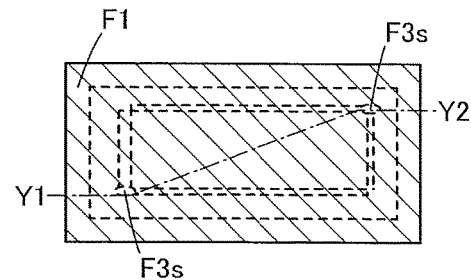

FIG. 13A1 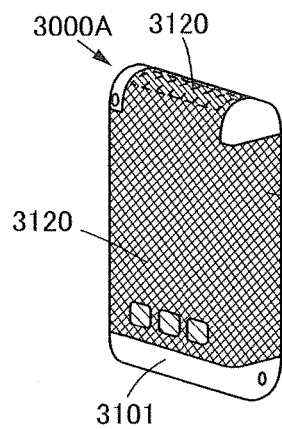
FIG. 13A2 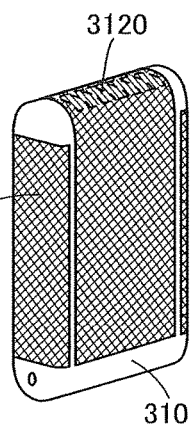
FIG. 13A3 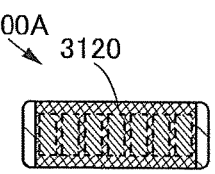
FIG. 13B1 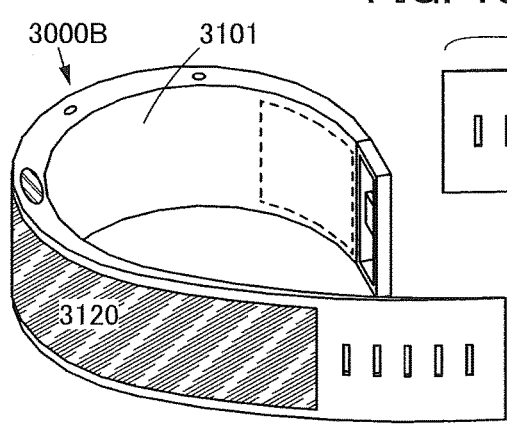
FIG. 13B2 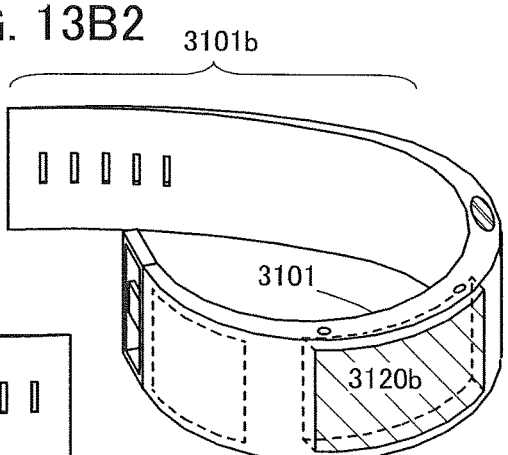
FIG. 13C1 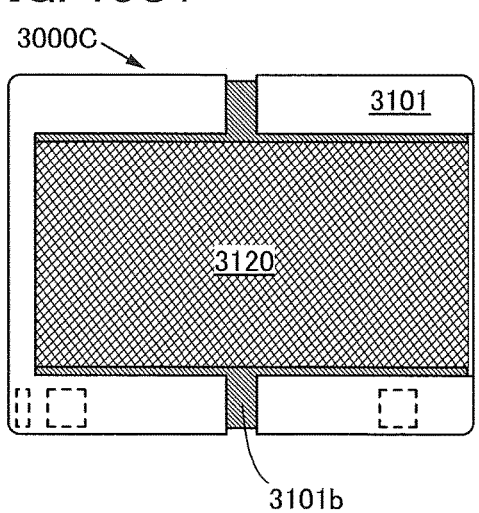
FIG. 13C2 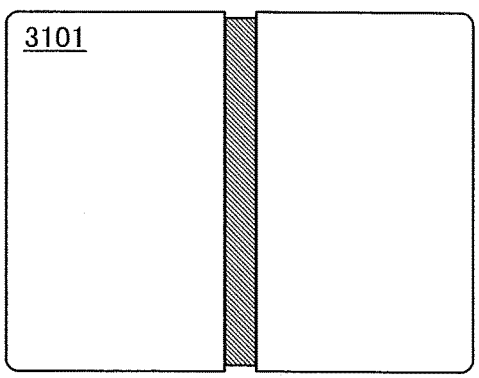

INFORMATION PROCESSING DEVICE

BACKGROUND OF THE INVENTION

1. Field of the Invention

One embodiment of the present invention relates to an information processing device, a program, or a semiconductor device.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

2. Description of the Related Art

The social infrastructures relating to means for transmitting information have advanced. This has made it possible to acquire, process, and send out many pieces and various kinds of information with the use of an information processing device not only at home or office but also at other visiting places.

With this being the situation, portable information processing devices are under active development.

For example, portable information processing devices are often used while being carried around by a user, and force might be accidentally applied, by dropping, to the information processing devices and display devices included in them. As an example of a display device that is not easily broken, a display device having high adhesiveness between a structure body by which a light-emitting layer is divided and a second electrode layer is known (Patent Document 1).

REFERENCE

Patent Document

[Patent Document 1] Japanese Published Patent Application No. 2012-190794

SUMMARY OF THE INVENTION

An object of one embodiment of the present invention is to provide a novel information processing device that is highly convenient or reliable. Another object of one embodiment of the present invention is to provide a novel information processing device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is an information processing device including an input portion which supplies a map and an arithmetic device to which the map is supplied.

The map includes a background map and a first map.

The arithmetic device includes a memory portion that stores a program for supplying predetermined instructions on the basis of the map and an arithmetic portion that executes the program.

The program includes a first step of executing interrupt processing and extracting a pattern, a second step of comparing the pattern with a reference table and proceeding to a third step when the pattern matches with a predetermined pattern and proceeding to the first step when the pattern does not match with the predetermined pattern, and the third step of supplying instructions associated with the predetermined pattern and proceeding to the first step.

The interrupt processing includes a fourth step of obtaining the background map and the first map and proceeding to a fifth step when the background map and the first map are different from each other and terminating the interrupt processing when they are not different from each other, the fifth step of performing a second map generation step of generating a second map on the basis of the background map and the first map, a sixth step of generating a binarization map on the basis of the second map, a seventh step of generating labeling data on the basis of the binarization map, an eighth step of generating or updating a data set on the basis of the labeling data, and a ninth step of extracting a pattern included in the data set.

The information processing device of one embodiment of the present invention includes the input portion supplying the map and the memory portion storing a program. The program includes interrupt processing in which a data set is generated from the map, a step of extracting a pattern from the data set generated through the interrupt processing, and a step of supplying instructions associated with a reference table when the extracted pattern is included in the reference table.

Note that the map includes sensing information and positional information associated with a sensed position, and the data set includes consecutive plural maps, and for example, time series of the maps can be used as the data set.

Thus, predetermined instructions can be supplied using the input portion. As a result, a novel information processing device that is highly convenient or reliable can be provided. Alternatively, a novel information processing device can be provided.

Another embodiment of the present invention is the above-described information processing device in which the second map generation step includes a tenth step of subtracting the background map from the first map, an eleventh step of generating a raised map by adding a same value, and a twelfth step of converting values over the upper limit in the raised map into the upper limit and converting values under the lower limit into the lower limit.

The information processing device of one embodiment of the present invention includes a memory portion, and the memory portion stores a program including a step of subtracting a background map from the first map.

Note that a map supplied by the input portion in a state of not being used by a user can be used as the background map.

Thus, noise can be removed from a map supplied by an input portion. Furthermore, with the map from which noise is removed, predetermined instructions can be supplied. As a result, a novel information processing device that is highly convenient or reliable can be provided. Alternatively, a novel information processing device can be provided.

Another embodiment of the present invention is the above-described information processing device in which the program includes a thirteenth step of supplying instructions associated with the predetermined pattern, a fourteenth step of generating a background map, and a fifteenth step of updating the background map and proceeding to the first step, instead of the third step.

The information processing device of one embodiment of the present invention includes a memory portion, and the memory portion stores a program including a step of generating a background map and a step of updating the background map.

Thus, a background map based on the state of the input portion can be updated. As a result, a novel information processing device that is highly convenient or reliable can be provided. Alternatively, a novel information processing device can be provided.

Another embodiment of the present invention is an information processing device in which an input portion includes a plurality of sensor units arranged in a matrix, a first control line (also referred to as a selection signal line) electrically connected to a plurality of sensor units arranged in a row direction, and a signal line electrically connected to a plurality of sensor units arranged in a column direction.

In the above-described information processing device, the sensor unit includes a first switch whose control terminal is electrically connected to the first control line and whose first terminal is electrically connected to the signal line, an amplifying transistor whose first electrode is electrically connected to a second terminal of the first switch and whose second electrode is electrically connected to a first power supply line, a capacitor whose first electrode is electrically connected to a gate of the amplifying transistor and the conductive film and whose second electrode is electrically connected to a second control line, and a second switch whose first terminal is electrically connected to the gate of the amplifying transistor, whose control terminal is electrically connected to a third control line, and whose second terminal is electrically connected to a second power supply line.

Another embodiment of the present invention is the above-described information processing device in which the input portion can be folded or unfolded.

In this specification, the term "light-emitting device" means an image display device, and a light source (including a lighting device). In addition, the light-emitting device includes any of the following modules in its category: a module in which a connector such as a flexible printed circuit (FPC) or a tape carrier package (TCP) is attached to a light-emitting device; a module having a TCP provided with a printed wiring board at the end thereof; and a module having an integrated circuit (IC) directly mounted on a substrate over which a light-emitting element is formed by a chip on glass (COG) method.

Although the block diagram attached to this specification shows elements classified according to their functions in independent blocks, it might be practically difficult to completely separate the elements according to their functions and, in some cases, one element might be involved in a plurality of functions.

In this specification, the terms "source" and "drain" of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. Furthermore, in a p-channel transistor, a terminal to which a lower potential is applied is called a drain, and a terminal to which a higher potential is applied is called a source. In this specification, although connection relationship of the transistor is described assuming that the source and the drain are fixed in some cases for convenience, actually, the names of the source and the drain interchange with each other depending on the relationship of the potentials.

Note that in this specification, a "source" of a transistor means a source region that is part of a semiconductor film functioning as an active layer or a source electrode connected to the semiconductor film. Similarly, a "drain" of the transistor means a drain region that is part of the semiconductor film or a drain electrode connected to the semiconductor film. A "gate" means a gate electrode.

Note that in this specification, a state in which transistors are connected to each other in series means, for example, a state in which only one of a source and a drain of a first transistor is connected to only one of a source and a drain of a second transistor. In addition, a state in which transistors are connected to each other in parallel means a state in which one of a source and a drain of a first transistor is connected to one of a source and a drain of a second transistor and the other of the source and the drain of the first transistor is connected to the other of the source and the drain of the second transistor. Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

In this specification, the term "connection" means electrical connection and corresponds to a state where current, voltage, or a potential can be supplied or transmitted. Accordingly, a connection state means not only a state of direct connection but also a state of indirect connection through a circuit element such as a wiring, a resistor, a diode, or a transistor so that current, voltage, or a potential can be supplied or transmitted.

In this specification, even when different components are connected to each other in a circuit diagram, there is actually a case where one conductive film has functions of a plurality of components such as a case where part of a wiring serves as an electrode. The term "connection" also means such a case where one conductive film has functions of a plurality of components.

Furthermore, in this specification, one of a first electrode and a second electrode of a transistor refers to a source electrode and the other refers to a drain electrode.

According to one embodiment of the present invention, a novel information processing device that is highly convenient or reliable can be provided. Alternatively, a novel information processing device or a novel semiconductor device can be provided.

Note that the description of these effects does not disturb the existence of other effects. One embodiment of the present invention does not necessarily have all the effects. Other effects will be apparent from and can be derived from the description of the specification, the drawings, the claims, and the like.

BRIEF DESCRIPTION OF THE DRAWINGS

In the accompanying drawings:

FIG. 3A1 is a block diagram illustrating a structure of an input portion of an information processing device of an embodiment; FIG. 3A2 is a circuit diagram illustrating a configuration of a sensor unit; FIGS. 3B to 3D2 are schematic views showing maps;

FIGS. 7A1, 7A2, 7B1, 7B2, 7C, 7D1, 7D2, 7E1, and 7E2 are schematic views illustrating a manufacturing process of a stack of an embodiment;

FIGS. 8A1, 8A2, 8B1, 8B2, 8C, 8D1, 8D2, 8E1, and 8E2 are schematic views illustrating a manufacturing process of a stack of an embodiment;

FIGS. 9A1, 9A2, 9B, 9C, 9D1, 9D2, 9E1, and 9E2 are schematic views illustrating a manufacturing process of a stack of an embodiment;

FIGS. 10A1, 10A2, 10B1, 10B2, 10C1, 10C2, 10D1, and 10D2 are schematic views illustrating manufacturing processes of stacks each including an opening portion in a support of an embodiment;

FIGS. 11A1, 11A2, 11B1, and 11B2 are schematic views illustrating structures of processed members of an embodiment;

FIGS. 13A1, 13A2, 13A3, 13B1, 13B2, 13C1, and 13C2 are projection views illustrating structures of information processing devices of an embodiment.

DETAILED DESCRIPTION OF THE INVENTION

Figure 1:
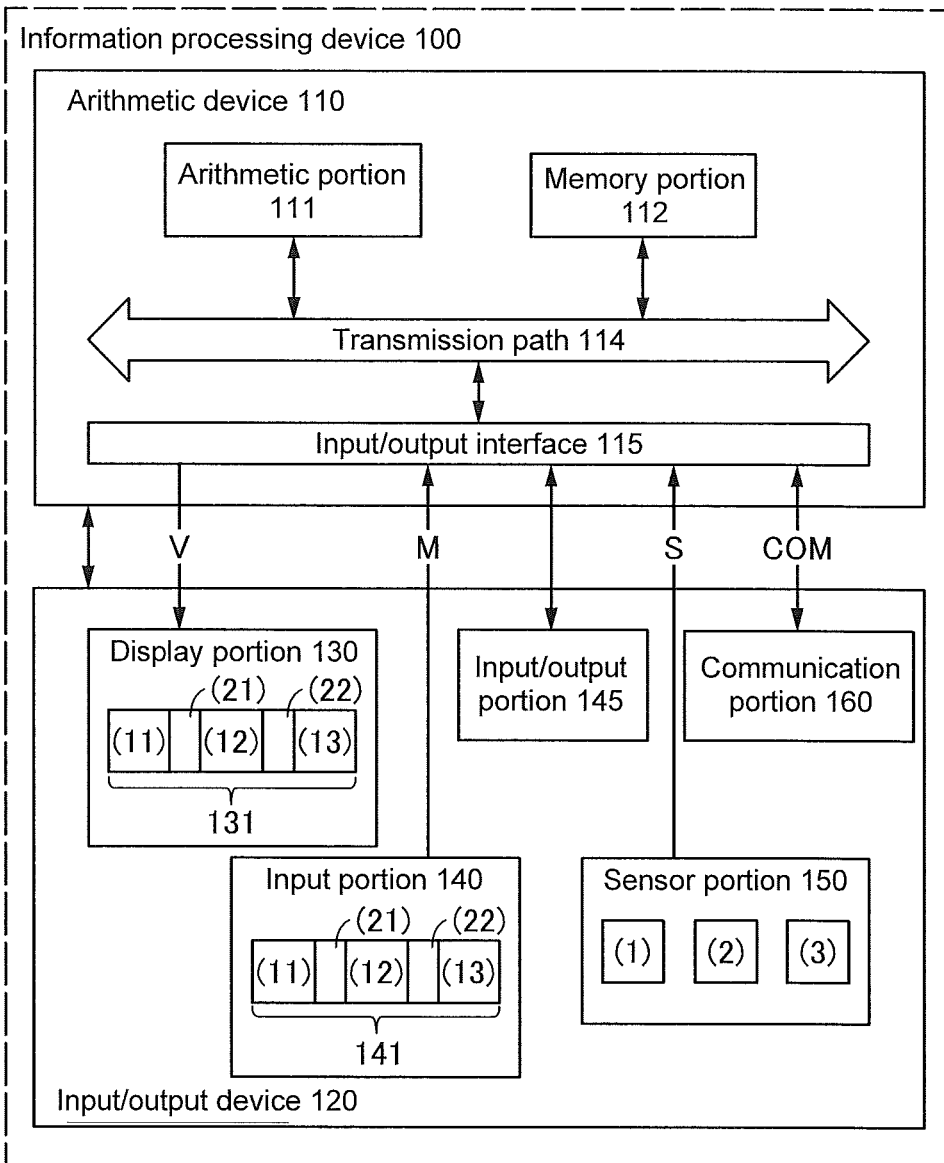
FIG. 1 is a block diagram illustrating a structure of an information processing device of an embodiment.

An information processing device of one embodiment of the present invention includes an input portion supplying a map and a memory portion storing a program. The program includes interrupt processing in which a data set is generated from the map, a step of extracting a pattern from the data set generated through the interrupt processing, and a step of supplying instructions associated with a reference table when the extracted pattern is included in the reference table.

Note that the map includes sensing information and positional information associated with a sensed position, and the data set includes consecutive plural maps, and for example, time series of the maps can be used as the data set.

Thus, predetermined instructions can be supplied using the input portion. As a result, a novel information processing device that is highly convenient or reliable can be provided. Alternatively, a novel information processing device can be provided.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and description of such portions is not repeated.

(Embodiment 1)

In this embodiment, a structure of an information processing device of one embodiment of the present invention will be described with reference to FIG. 1, FIGS. 2A to 2C, and FIGS. 3A1, 3A2, 3B, 3C1, 3C2, 3C3, 3D1, and 3D2.

Figure 2A:
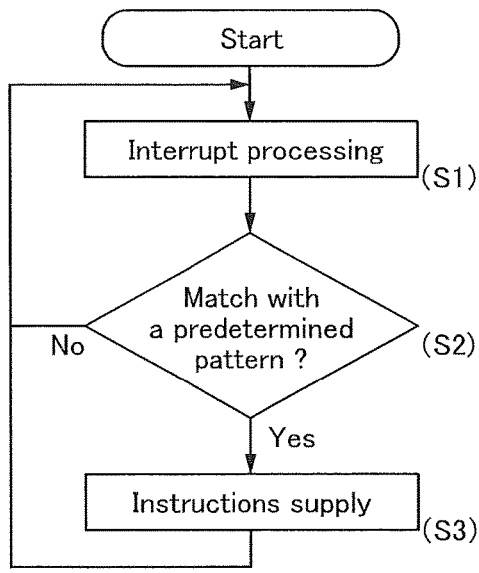
FIGS. 2A to 2C are flowcharts illustrating a program stored in a memory portion of an information processing device of an embodiment.
Figure 2B:
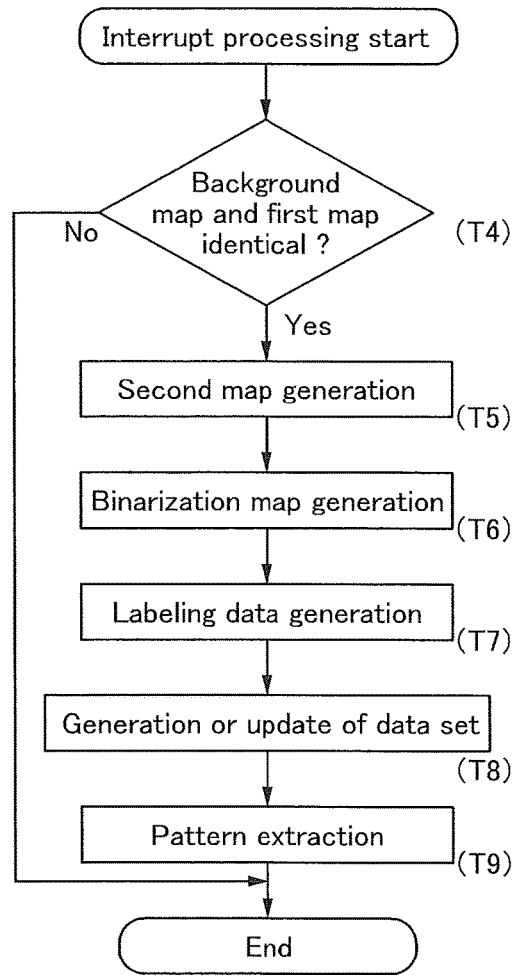
Figure 2C:
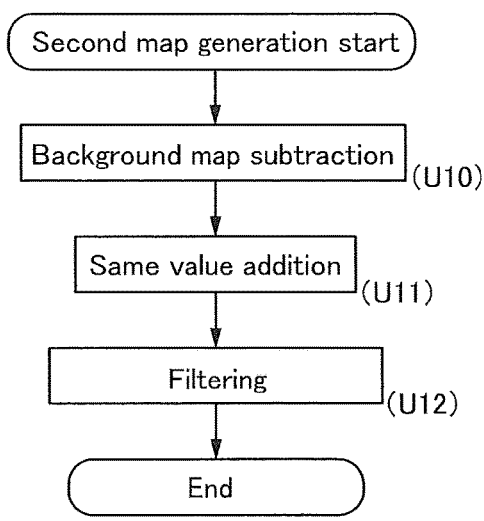

FIG. 1 is a block diagram illustrating the structure of the information processing device of one embodiment of the present invention. FIGS. 2A to 2C are flowcharts of a program stored in a memory portion of the information processing device of one embodiment of the present invention. FIGS. 3A1 to 3D2 are block diagrams illustrating a structure of an input portion that can be used in the information processing device of one embodiment of the present invention and schematic views of maps showing operation of the input portion.

FIG. 2A is a flowchart of a main part of a program of one embodiment of the present invention, FIG. 2B is a flowchart of an interrupt processing, and FIG. 2C is a flowchart showing a second map generation step.

FIG. 3A1 is a block diagram illustrating the structure of the input portion, and FIG. 3A2 is a circuit diagram illustrating a configuration of a sensor unit in the input portion. FIGS. 3D1 and 3D2 are schematic views of maps illustrating a step of generating a binarization map of a program of one embodiment of the present invention and a step of generating labeling data.

<Structure Example 1 of Information Processing Device>

An information processing device 100 described in this embodiment includes an input portion 140 which supplies a map M and an arithmetic device 110 to which the map M is supplied (see FIG. 1).

The map M includes a background map MBK and a first map M1.

The arithmetic device 110 includes a memory portion 112 and an arithmetic portion 111.

The memory portion 112 stores a program for supplying predetermined instructions on the basis of the map M.

The arithmetic portion 111 executes a program including the following steps.

<<First Step>>

In a first step, interrupt processing is executed to extract a pattern (see (S1) in FIG. 2A). Note that the detail of the interrupt processing is described in a fourth step to a ninth step.

<<Second Step>>

In a second step, the pattern is compared with a reference table, and the program proceeds to a third step when the pattern matches with a predetermined pattern and the program proceeds to the first step when the pattern does not match with the predetermined pattern (see (S2) in FIG. 2A).

Accordingly, a user of the information processing device 100 can make a gesture in the vicinity of the input portion 140 by moving a finger, a stylus, or the like which is close to and/or in contact with the input portion 140 so as to draw the predetermined pattern.

<<Third Step>>

In the third step, instructions associated with the predetermined pattern are supplied and the program proceeds to the first step (see (S3) in FIG. 2A).

The interrupt processing includes the following steps.

<<Fourth Step>>

In a fourth step, the background map MBK and the first map M1 are obtained, and the program proceeds to a fifth step when the background map MBK and the first map M1 are different from each other and the interrupt processing is terminated when they are not different from each other (see (T4) in FIG. 2B).

The background map MBK serves as a reference map. For example, a signal supplied by the input portion 140 while an object that can be sensed is not close to and/or is not in contact with the input portion 140 can be used for generating the background map MBK.

For example, a map obtained at a time different from a time at which the background map MBK was obtained in the input portion 140 can be used as the first map M1. Specifically, a map sequentially updated by maps supplied by the input portion 140 at predetermined intervals can be used as the first map M1.

<<Fifth Step>>

In the fifth step, the second map generation step in which a second map M2 is generated on the basis of the background map MBK and the first map M1 is performed (see (T5) in FIG. 2B).

Note that a variety of methods can be used for the second map generation step. The details will be described later.

<<Sixth Step>>

In a sixth step, a binarization map MBI is generated on the basis of the second map M2 (see (T6) in FIG. 2B).

For example, the second map M2 including cells in eight rows and eight columns is schematically shown (see FIG. 3C3). In addition, the binarization map MBI obtained by binarizing the second map M2 is schematically shown (see FIG. 3D1). To visualize difference between values of the cells, different hatching patterns correspond to the values of the cells.

A variety of methods can be used as the method for binarizing the values of the map. For example, in the case where 8-bit data is used, the values of the cells can be binarized to 0 or 255. Note that a threshold value used at the time of binarization may be determined by the user or the arithmetic device.

<<Seventh Step>>

In a seventh step, labeling data LD is generated on the basis of the binarization map MBI (see (T7) in FIG. 2B).

A variety of methods can be used as a method for labeling. For example, a step for giving the same label to each cell when the value of the cell is equal to the value of an adjacent cell (see FIG. 3D2).

Accordingly, positional information of each region to which the same label is given can be specified. For example, the center of the region to which the same label is given can be the positional information of the region.

As a result, labeling data LD that is associated with the sensing information and the positional information of the object close to and/or in contact with the input portion 140 can be generated.

<<Eighth Step>>

In an eighth step, a data set is generated or updated on the basis of the labeling data LD (see (T8) in FIG. 2B).

<<Ninth Step>>

In a ninth step, a pattern included in the data set is extracted (see (T9) in FIG. 2B).

The data set includes consecutive plural labeling data. For example, time series of the labeling data LD can be used as the data set.

Note that the labeling data LD is associated with the sensing information and the positional information of the object close to and/or in contact with the input portion 140.

For example, the labeling data LD can include information on the number and the position of objects close to and/or in contact with the input portion 140, the distance between the objects and the input portion 140, and the like.

By using such a data set, tracks made by the transfer of the object close to and/or in contact with the input portion 140 can be found and the pattern can be extracted.

Specifically, a track drawn with a finger tapping substantially the same place, a track drawn with a finger dragging in one direction, a track drawn by pinching with two fingers expanding the interval between the two fingers, and the like can be extracted. After the ninth step, the interrupt processing is terminated.

The data set includes consecutive plural maps. For example, time series of the maps can be used as the data set. By using a data set including the time series of the maps, tracks made by the transfer of the object close to and/or in contact with the input portion 140 can be found.

The information processing device 100 of one embodiment of the present invention includes the input portion 140 supplying the map M and the memory portion 112 storing a program. The program includes interrupt processing in which a data set is generated from the map M, a step of extracting a pattern from the data set generated through the interrupt processing, and a step of supplying instructions associated with a reference table when the extracted pattern is included in the reference table.

Note that the map M includes sensing information and positional information associated with a sensed position, and the data set includes consecutive plural maps, and for example, time series of the maps can be used as the data set.

Thus, predetermined instructions can be supplied using the input portion 140. As a result, a novel information processing device that is highly convenient or reliable can be provided. Alternatively, a novel information processing device can be provided.

For example, a user of the information processing device 100 can supply a variety of operating instructions to the information processing device 100 by making his/her finger, palm, or the like in proximity to the input portion 140.

For example, operation instructions including termination instructions (instructions to terminate the program) can be supplied.

Individual components included in the information processing device will be described below. Note that these components cannot be clearly distinguished and one component also serves as another component or include part of another component in some cases.

For example, a touch panel in which a touch sensor is provided so as to overlap with a display panel serves as the input portion 140 as well as a display portion 130.

Note that although a touch sensor having a structure where the input portion 140 is placed on the display surface side of the display portion 130 is described as an example in this embodiment, one embodiment of the present invention is not limited to this structure. Specifically, the display portion 130 may be placed on the sensing surface side of the input portion 140, or the display portion 130 and the input portion 140 may be integrated into one unit. In other words, either of an on-cell touch panel or an in-cell touch panel may be employed.

<<Overall Structure>>

The information processing device 100 includes an input/output device 120 and the arithmetic device 110 (see FIG. 1).

<<Input/Output Device 120>>

The input/output device 120 can be supplied with display information V and can supply the map M and sensing information S. The arithmetic device 110 and the input/output device 120 can supply and receive various kinds of information to/from each other.

The input/output device 120 includes the display portion 130, the input portion 140, an input/output portion 145, a sensor portion 150, and a communication portion 160.

<<Display Portion 130>>

The display portion 130 is supplied with the display information V and can display the display information V.

The display portion 130 includes a display region 131 and displays the display information V on the display region 131.

The display region 131 may include a first display region 131(11), a first bendable display region 131(21), a second display region 131(12), a second bendable display region 131(22), and a third display region 131(13).

The first bendable display region 131(21) and the second bendable display region 131(22) can display the display information V and can be bent.

For example, the first bendable display region 131(21) and the second bendable display region 131(22) can be bent with a radius of curvature of 10 mm or less, preferably 8 mm or less, further preferably 5 mm or less, further preferably 4 mm or less.

The display portion 130 can be folded such that a first fold line is formed in the first bendable display region 131(21) and can be unfolded along the first fold line.

The display portion 130 can be folded such that a second fold line is formed in the second bendable display region 131(22) and can be unfolded along the second fold line.

The first display region 131(11) and the second display region 131(12) may be driven together. For example, one scan line driver circuit may supply signals to select scan lines.

The first display region 131(11) and the second display region 131(12) may be driven separately. For example, separate driver circuits may be provided for the display regions, and the scan line driver circuits may supply signals to select scan lines to the corresponding display regions.

For example, while the information processing device 100 is in the standby state, only the first display region 131(11) and/or the first bendable display region 131(21) may be driven and the driving of the other regions may be stopped.

Alternatively, while the information processing device 100 is folded, only the first display region 131(11) and/or the first bendable display region 131(21) may be driven and the driving of the other regions that cannot be viewed may be stopped. Stopping the driving of the other regions can reduce power consumption.

<<Input Portion 140>>

The input portion 140 supplies the map M. For example, an object close to and/or in contact with the input portion 140 is sensed, and the sensing information is supplied with positional information regarding the sensed position.

Note that the map M includes sensing information and positional information regarding a sensed position. Data including consecutive plural maps is referred to as a data set. For example, time series of the maps can be used as the data set.

For example, the input portion 140 is provided with a sensor units U n) arranged in a matrix of m rows and n columns (see FIG. 3A1). Note that m and n are natural numbers and at least one of m and n is a natural number of 2 or more. In addition, a first control line that electrically connects a first group of sensor units arranged in the row direction, a signal line that electrically connects a second group of sensor units arranged in the column direction, and the like can be provided.

For example, a matrix of m rows and n columns in which sensing signals supplied by the sensor units U (m, n) are associated with the positions of the sensor units U (m, n) can be used as a format of data of the map M. Specifically, in the format of data, values of a component (i, j) in a matrix of m rows and n columns may be based on the sensing signals supplied by the sensor units U (i, j). Note that i is a natural number of m or less, and j is a natural number of n or less.

The input portion 140 can include the plurality of sensor units U (m, n), a first control line, a support base, and the like. In addition, a driver circuit that can supply a selection signal, a driver circuit that can supply a sensing signal, or the like can be included.

The input portion 140 is provided with a first input portion 141(11), a second input portion 141(12), a third input portion 141(13), a fourth input portion 141(21), and a fifth input portion 141(22).

The input portion 140 may be provided so as to overlap with the display portion 130.

Specifically, the first input portion 141(11) is provided so as to overlap with the first display region 131(11), the second input portion 141(12) is provided so as to overlap with the second display region 131(12), the third input portion 141(13) is provided so as to overlap with the third display region 131(13), the fourth input portion 141(21) that is bendable is provided so as to overlap with the first bendable display region 131(21), and the fifth input portion 141(22) that is bendable is provided so as to overlap with the second bendable display region 131(22).

Note that in the case where the input portion 140 is provided on the side closer to a user than the display portion 130, the input portion 140 has a light-transmitting property.

The first input portion 141(11) can be driven either together with or separately from any of the other input portions.

For example, in the case where the sum of power consumed by the first input portion 141(11) and power consumed by the second input portion 141(12) is larger than power consumed by the first input portion 141(11), only the first input portion 141(11) may be driven and the drive of the second input portion 141(12) may be stopped in a standby state of the information processing device 100. Stopping the drive of the second input portion 141(12) can reduce power consumption.

Sensor elements arranged in the input portion are able to sense objects close to and/or in contact with the input portion (e.g., a finger or a palm), and for example, a coil, a magnetic sensor, a photoelectric conversion element, a capacitor one electrode of which is electrically connected to a conductive film, or the like can be used as the sensor element. A substrate provided with a photoelectric conversion element can be referred to as an optical touch sensor, and a substrate provided with capacitors arranged in a matrix can be referred to as a capacitive touch sensor.

<<Sensor Unit U (m, n)>>

The sensor unit U (m, n) can sense a variety of objects. The sensor unit U (m, n) senses an object close to or in contact with the sensor unit U and supplies sensing information. For example, the sensor unit U senses capacitance, illuminance, magnetic force, a radio wave, pressure, or the like and supplies information based on the sensed physical value. Specifically, a capacitor, a photoelectric conversion element, a magnetic sensor element, a piezoelectric element, a resonator, or the like can be used as a sensor element.

Specifically, in the air, when a finger or the like whose dielectric constant is larger than that of the air approaches the conductive film, capacitance between the finger and the conductive film is changed. The sensor unit U can sense the change in capacitance and supply a sensing signal. Specifically, the conductive film and a capacitor one electrode of which is connected to the conductive film can be used. Electric charge is distributed depending on the change in capacitance, so that voltage between the electrodes of the capacitor is changed. The change in voltage can be used as the sensing signal.

In the case where the input portion 140 includes the plurality of sensor units U arranged in a matrix, a first control line G1 electrically connected to the plurality of sensor units U arranged in the row direction, and a signal line DL electrically connected to the plurality of sensor units U arranged in the column direction, the sensor unit U having a following structure can be used, for example.

The sensor unit U includes a first switch SW1 whose control terminal is electrically connected to the first control line G1 and whose first terminal is electrically connected to the signal line DL.

In addition, the sensor unit U includes an amplifying transistor M10 whose first electrode is electrically connected to a second terminal of the first switch SW1 and whose second electrode is electrically connected to a first power supply line VPI.

Furthermore, the sensor unit U includes a capacitor C1 whose first electrode is electrically connected to a gate of the amplifying transistor M10 and the conductive film and whose second electrode is electrically connected to a second control line CS. A node at which the gate of the amplifying transistor M10, the second electrode of the capacitor C1, and the conductive film are electrically connected to each other is referred to as a node A. The amplifying transistor M10 delivers current whose value is based on the potential of the node A, between the first electrode and the second electrode. Thus, for example, with a circuit supplying information based on current flowing through the signal line DL, sensing information based on the sensing signal supplied by the sensor unit can be supplied.

In addition, the sensor unit U includes a second switch SW2 whose first terminal is electrically connected to the gate of the amplifying transistor M10, whose control terminal is electrically connected to a third control line RES, and whose second terminal is electrically connected to a second power supply line VRES.

<<Sensor Portion 150>>

The sensor portion 150 can sense the states of the information processing device 100 and/or the circumstances and supply the sensing information S (see FIG. 1).

The sensor portion 150 senses whether the input/output device 120 is folded or unfolded and supplies the sensing information S containing information that shows the folded or unfolded state of the input/output device 120. Specifically, the sensor portion 150 senses whether the display portion 130 and/or the input portion 140 are folded or unfolded.

The folded or unfolded state of the input/output device 120 can be sensed by various sensors.

The folded state of the input/output device 120 can be sensed by, for example, a mechanical switch, an optical switch, a magnetic sensor, a photoelectric conversion element, a MEMS pressure sensor, or a pressure-sensitive sensor.

For example, an object that obstructs display of the second display region 131(12) or the third display region 131(13) is sensed, whereby the folded state of the display portion 130 can be sensed.

Specifically, the photoelectric conversion element is placed in the information processing device 100 such that the display information V displayed on the second display region 131(12) is sensed while the input/output device is folded, and the third display region 131(13) is sensed by the photoelectric conversion element to sense whether the display portion 130 is folded in the second bendable display region 131(22).

Note that the sensor portion 150 may sense acceleration, angular acceleration, a direction, pressure, a global positioning system (GPS) signal, temperature, humidity, or the like and supply data thereon.

<<Communication Portion 160>>

The communication portion 160 supplies and is supplied with communication information COM. The communication portion 160 supplies the information COM supplied by the arithmetic device 110 to a device or a communication network outside the information processing device 100. Furthermore, the communication portion 160 acquires the information COM from the device or communication network outside the information processing device 100 and supplies the information COM.

The information COM can contain a variety of instructions or the like in addition to phonetic data, image data, or the like. For example, the information COM can contain operating instructions to make the arithmetic portion 111 generate or delete the display information V.

A communication means for connection to the external device or external communication network, e.g., a hub, a router, or a modem, can be used for the communication portion 160. Note that the connection method is not limited to a method using a wire, and a wireless method (e.g., radio waves or infrared rays) may be used.

<<Input/Output Portion 145>>

The input/output portion 145 supplies and is supplied with various kinds of information. As the input/output portion 145, for example, a camera, a microphone, a read-only external storage portion, an external storage portion, a scanner, a speaker, or a printer can be used.

Specifically, a digital camera, a digital video camera, or the like can be used as a camera.

As an external storage portion; a hard disk, a removable memory, or the like can be used. As a read-only external storage portion, a CD-ROM, a DVD-ROM, or the like can be used.

<<Arithmetic Device 110>>

The arithmetic device 110 includes the arithmetic portion 111 and the memory portion 112. The arithmetic device 110 supplies the display information V and is supplied with the map M and the sensing information S (see FIG. 1).

For example, the arithmetic device 110 supplies the display information V containing an image for operation of the information processing device 100.

To the arithmetic device 110, the map M may be supplied.

For example, by touching the input portion 140 in a portion overlapping with the image used for operation, which is displayed on the display portion 130, with a finger or the like, a user can supply operating instructions associated with the image to the arithmetic device 110.

The arithmetic device 110 may further include a transmission path 114 and an input/output interface 115.

<<Arithmetic Portion 111>>

The arithmetic portion 111 executes the program stored in the memory portion 112. For example, in response to supply of the positional information L of a position in which an image used for operation is displayed, the arithmetic portion 111 executes a program associated with the image.

<<Memory Portion 112>>

The memory portion 112 stores the program to be executed by the arithmetic portion 111.

<<Input/Output Interface and Transmission Path>>

The input/output interface 115 supplies information and is supplied with information.

The transmission path 114 can supply information, and the arithmetic portion 111, the memory portion 112, and the input/output interface 115 are supplied with information. In addition, the arithmetic portion 111, the memory portion 112, and the input/output interface 115 can supply information, and the transmission path 114 is supplied with information.

<<Housing>>

The information processing device 100 may include a housing. The housing can protect the arithmetic device 110 or the like from various kinds of stresses applied to the information processing device 100.

Metal, plastic, glass, ceramics, or the like can be used for the housing.

<Structure Example 2 of Information Processing Device>

In this embodiment, another structure of the information processing device of one embodiment of the present invention will be described with reference to FIG. 2C and FIGS. 3A1 to 3D2.

FIG. 2C is a flowchart of a program stored in the memory portion of the information processing device of one embodiment of the present invention.

FIG. 3A1 is a block diagram of the input portion 140 in the information processing device of one embodiment of the present invention, and FIG. 3A2 is a circuit diagram illustrating a configuration of a sensor unit that can be used in the input portion 140. FIGS. 3B to 3D2 are schematic views showing maps supplied by the input portion 140.

Structure example 2 of the information processing device 100 described in this embodiment is different from the structure example 1 of the information processing device 100 described above in that the memory portion 112 stores a program to perform a second map generation step including the following steps. Different structures will be described in detail below, and the above description is referred to for the other similar structures.

The arithmetic portion 111 executes a program including the following steps stored in the memory portion 112.

Tenth Step>>

In a tenth step, the background map MBK is subtracted from the first map M1 (see (U10) in FIG. 2C).

A schematic view of the background map MBK is shown (see FIG. 3B). Although the background map shown here has eight rows and eight columns, the background map is not limited thereto. Different hatching patterns are used to show cells with different values.

A schematic view of the first map M1 is shown (see FIG. 3C1). Although the first map M1 shown here has eight rows and eight columns, the first map M1 is not limited thereto. For example, a signal supplied by the input portion 140 in a state where an object that can be sensed by the input portion 140 is close to and/or in contact with the input portion 140 can be used for generating the first map.

The first map M1 is compared with the background map MBK. Specifically, the background map MBK is subtracted from the first map M1. Thus, information associated with the object close to and/or in contact with the input portion 140 can be obtained. For example, information on the number and the position of the objects close to and/or in contact with the input portion 140, the distance between the objects and the input portion 140, and the like can be obtained (see FIG. 3C2).

<<Eleventh Step>>

In an eleventh step, a same value is added to the result obtained in the tenth step, and a raised map is formed (see (U11) in FIG. 2C).

For example, the same value is added to each cell. Specifically, in the case where an 8-bit signal is used, the median value of 127 may be added to each cell (see FIG. 3C3).

<<Twelfth Step>>

In a twelfth step, values over the upper limit in the raised map are converted into the upper limit, and values under the lower limit are converted into the lower limit (see (U12) in FIG. 2C) in a filtering operation. Note that the map becomes the second map M2. After the twelfth step, the second map generation step is terminated.

Specifically, in the case where the 8-bit signal is used, the values over 255 are converted into 255, and the values under 0 are converted into 0.

The structure example 2 of the information processing device 100 described in this embodiment includes the memory portion 112, and the memory portion 112 stores a program including a step of subtracting the background map MBK from the first map M1.

Note that a map supplied by the input portion 140 in a state of not being used by a user can be used as the background map MBK.

Thus, noise can be removed from a map supplied by an input portion. Furthermore, with the map from which noise is removed, predetermined instructions can be supplied. As a result, a novel information processing device that is highly convenient or reliable can be provided. Alternatively, a novel information processing device can be provided.

<Structure Example 3 of Information Processing Device>

Another structure of the information processing device of one embodiment of the present invention will be described with reference to FIG. 4.

Figure 4:
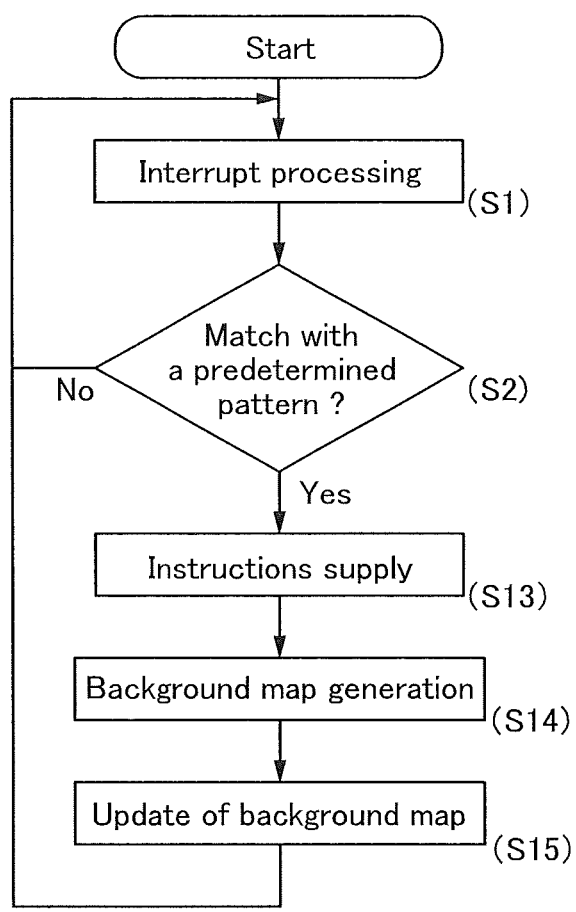
FIG. 4 is a flowchart illustrating a program stored in a memory portion of an information processing device of an embodiment.

FIG. 4 is a flowchart showing a modification example of the main part of the program of one embodiment of the present invention.

A structure example 3 of the information processing device 100 described in this embodiment is different from the structure example 1 or the structure example 2 of the information processing device 100 described above in that the memory portion 112 stores a program including a thirteenth step to a fifteenth step described below instead of the third step. Different structures will be described in detail below, and the above description is referred to for the other similar structures.

The arithmetic portion 111 executes a program including the following steps stored in the memory portion 112.

<<Thirteenth Step>>

In a thirteenth step, instructions associated with the predetermined pattern with which the pattern matches in the second step are supplied.

<<Fourteenth Step>>

In a fourteenth step, a background map MBK is generated.

For example, in the case where the input portion 140 is provided to overlap with the display portion 130, the input portion 140 is influenced by an operation state of the display portion 130 in some cases. Specifically, an operation of a display element of the display portion 130 may influence an operation of a sensor element of the input portion 140. Thus, the background map MBK is changed by the influence of the display information V in some cases.

For example, in the case where the background map MBK is changed by the influence of the display information V, a background map MBK may be regenerated on the basis of the change of the display information V. Specifically, the first map M1 is obtained after the display information V is supplied on the basis of the instructions supplied in the thirteenth step, and the background map MBK may be generated using the obtained first map M1.

<<Fifteenth Step>>

In a fifteenth step, the background map is updated by the generated background map MBK, and the program proceeds to the first step.

Accordingly, for example, the input portion 140 is placed to overlap with the display portion 130, whereby even when the background map MBK is influenced by the display information V, a background map MBK to which the influence is added can be anew generated. As a result, with the background map MBK, the influence by the display information V can be offset.

The structure example 2 of the information processing device 100 described in this embodiment includes the memory portion 112, and the memory portion 112 stores a program including a step of generating the background map MBK and a step of updating the background map MBK.

Thus, a background map based on the state of the input portion can be updated. As a result, a novel information processing device that is highly convenient or reliable can be provided. Alternatively, a novel information processing device can be provided.

This embodiment can be combined with any of the other embodiments in this specification as appropriate.

(Embodiment 2)

In this embodiment, a structure of an input/output device that can be used in the information processing device of one embodiment of the present invention will be described with reference to FIG. 5 and FIGS. 6A to 6C.

Figure 5:
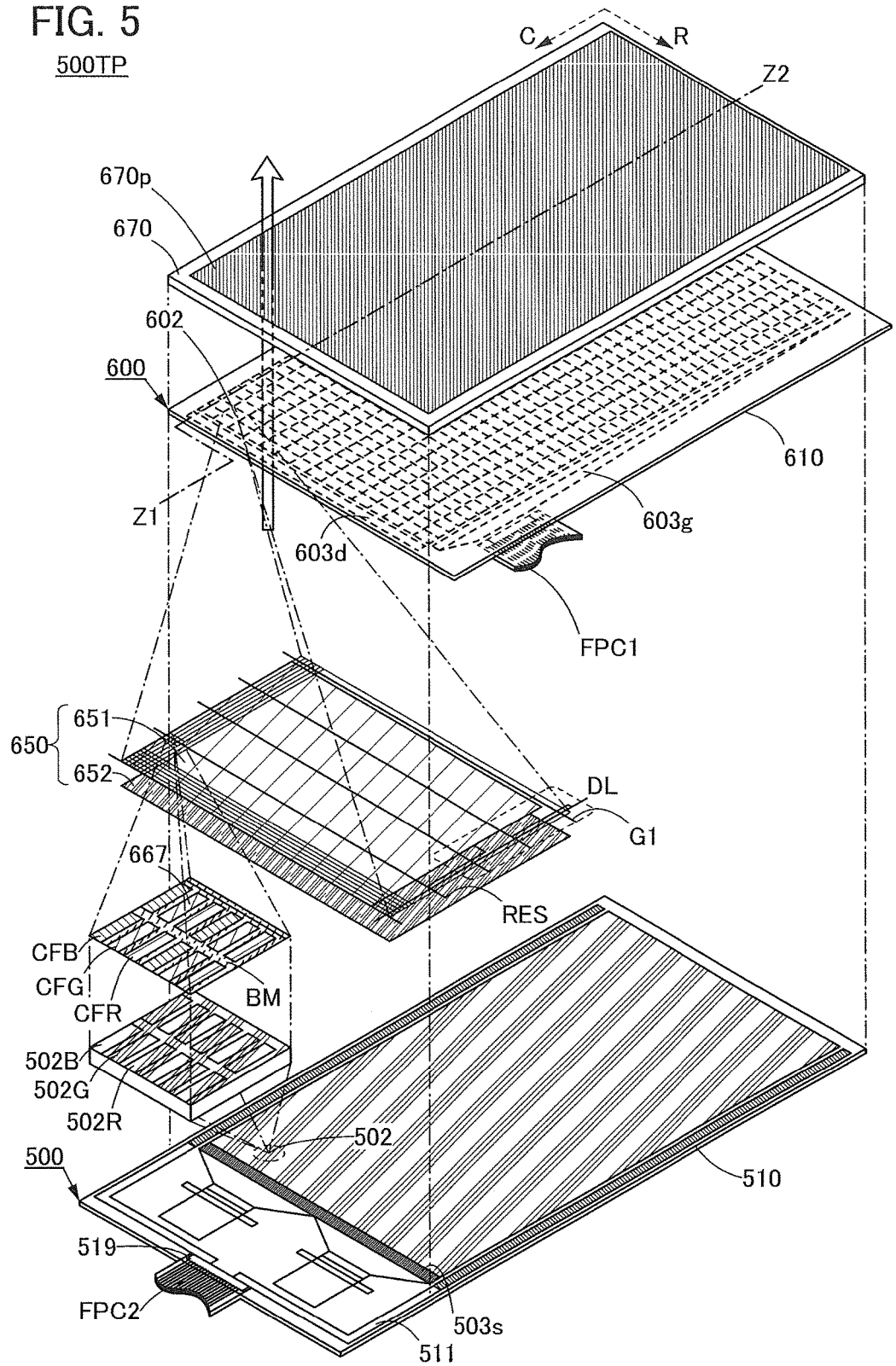
FIG. 5 is a projection view illustrating a structure of an input/output device of an embodiment.

FIG. 5 is a projection view illustrating a structure of an input/output device 500TP of one embodiment of the present invention. Note that for convenience of description, part of a sensor unit 602 and part of a pixel 502 are enlarged.

Figure 6A:
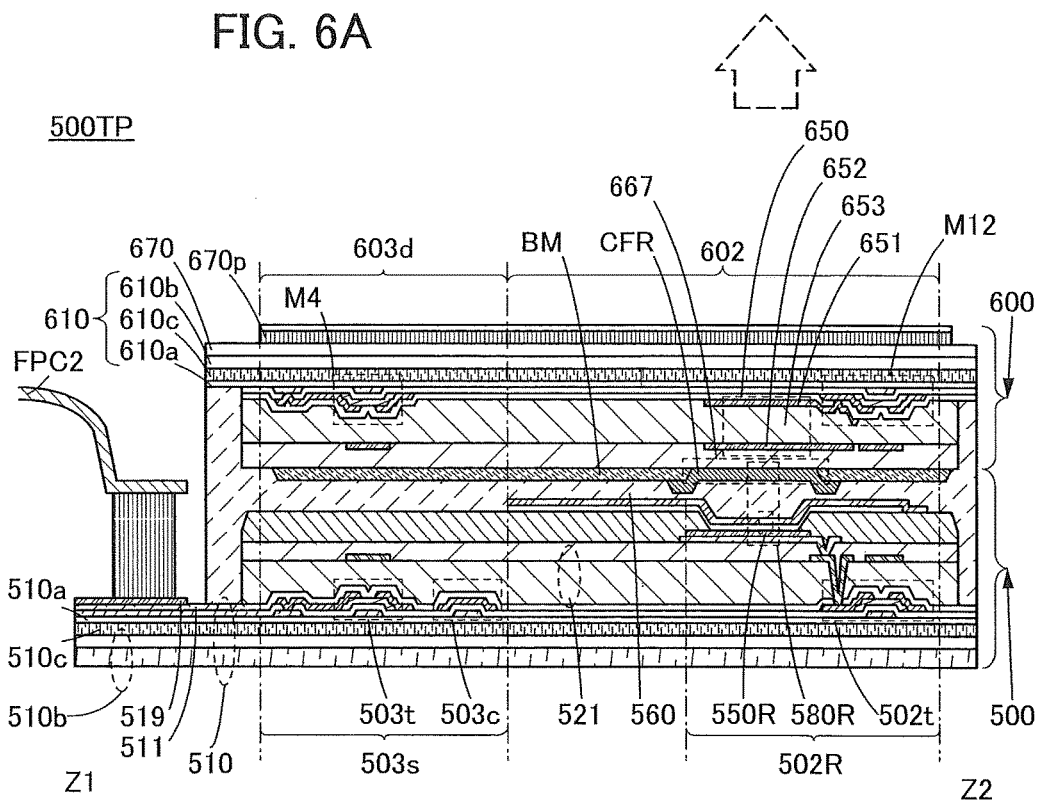
FIGS. 6A to 6C are cross-sectional views illustrating a structure of an input/output device of an embodiment.
Figure 6B:
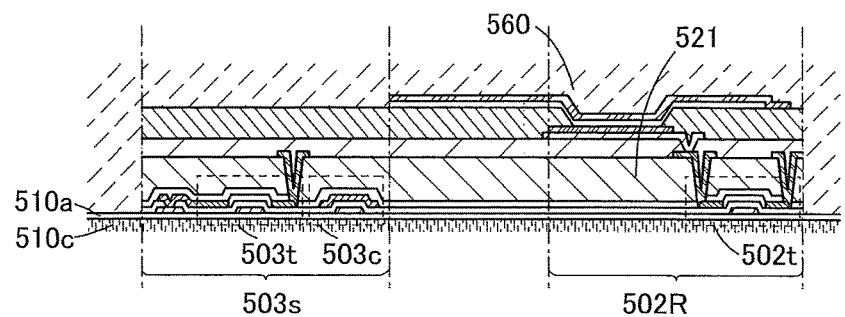
Figure 6C:
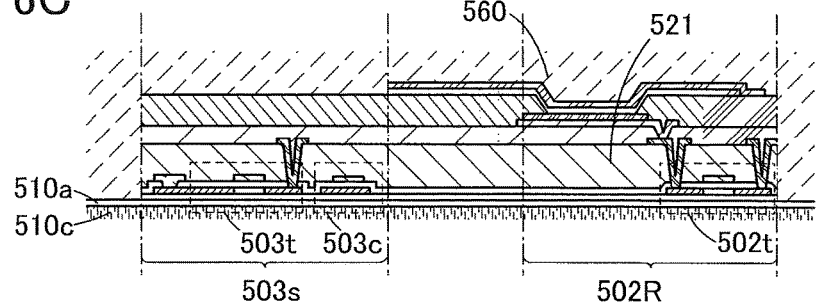

FIG. 6A is a cross-sectional view illustrating a cross-sectional structure of the input/output device 500TP of one embodiment of the present invention along line Z1-Z2 in FIG. 5. FIGS. 6B and 6C are each a cross-sectional view illustrating a modification example of a structure which can replace part of the structure in FIG. 6A.

<Structure Example of Input/Output Device>

The input/output device 500TP described in this embodiment includes a display portion 500 and an input portion 600 including a region overlapping with the display portion 500 (see FIG. 5).

The input portion 600 includes the plurality of sensor units 602 arranged in a matrix.

The input portion 600 further includes the first control line G1, the control line RES, and the like to which a plurality of sensor units 602 which are arranged in a row direction (denoted by an arrow R in FIG. 5) are electrically connected.

The input portion 600 further includes the signal line DL and the like to which a plurality of sensor units 602 which are arranged in a column direction (denoted by an arrow C in FIG. 5) are electrically connected.

The sensor unit 602 is provided with a sensor circuit. The sensor circuit is electrically connected to the first control line G1, the control line RES, the signal line DL, and the like.

A transistor, a sensor element, and/or the like can be used for the sensor circuit. For example, a conductive film and a capacitor electrically connected to the conductive film can be used for the sensor element. A capacitor and a transistor electrically connected to the capacitor can be used.

A capacitor 650 can be used for the sensor circuit. An insulating layer 653, and a first electrode 651 and a second electrode 652 between which the insulating layer 653 is provided can be used in the capacitor 650 (see FIG. 6A).

Furthermore, the sensor unit 602 includes a plurality of window portions 667 arranged in a matrix. The window portions 667 transmit visible light. A light-blocking layer BM may be provided between the window portions 667.

A coloring layer including a region overlapping the window portion 667 is included. The coloring layer transmits light of a predetermined color. For example, a coloring layer CFB that transmits blue light, a coloring layer CFG that transmits green light, and a coloring layer CFR that transmits red light can be used. Furthermore, a coloring layer that transmits yellow light and a coloring layer that transmits white light can be used. Note that the coloring layer can be referred to as a color filter.

The display portion 500 includes the plurality of pixels 502 arranged in a matrix. The pixel 502 is provided to include a region overlapping with the window portions 667 of the input portion 600.

The pixels 502 may be arranged at a high resolution as compared with the sensor units 602.

The input/output device 500TP described in this embodiment includes the input portion 600 including the plurality of sensor units 602 which are provided with the window portions 667 transmitting visible light and are arranged in a matrix, the display portion 500 including the plurality of pixels 502 overlapping with the window portions 667, and the coloring layer between the window portion 667 and the pixel 502. Furthermore, each sensor unit is provided with a switch capable of reducing electrical interference with another sensor unit. Note that the transistor or the like can be used as the switch.

Thus, sensing information obtained by each sensor unit can be supplied together with the positional information of the sensor unit. In addition, the sensing information associated with the positional information of pixels for displaying an image can be supplied. In addition, the sensor unit which does not supply the sensing information is not electrically connected to a signal line, whereby electrical interference with the sensor unit which supplies a sensing signal can be reduced. Thus, the novel input/output device 500TP that is highly convenient or reliable can be provided.

For example, the input portion 600 of the input/output device 500TP can sense sensing information and supplies the sensing information together with the positional information. Specifically, a user of the input/output device 500TP can make various gestures (e.g., tap, drag, swipe, and pinch in) using his/her finger or the like as a pointer on the input portion 600.

The input portion 600 is capable of sensing approach or contact of a finger or the like to the input portion 600 and supplying sensing information including the obtained position, track, or the like.

An arithmetic unit judges whether or not supplied information satisfies a predetermined condition on the basis of a program or the like and executes instructions associated with a predetermined gesture.

Thus, a user of the input portion 600 can make the predetermined gesture with his/her finger and make the arithmetic unit execute instructions associated with the predetermined gesture.

For example, the input portion 600 of the input/output device 500TP is capable of selecting one of a plurality of sensor units that can supply sensing information to a signal line to cause a non-conduction state between the signal line and all sensor units except the selected one. Therefore, interference of the sensor units which are not selected with the selected sensor unit can be reduced.

Specifically, interference of the sensor elements of the sensor units which are not selected with the sensor element of the selected sensor unit can be reduced.

For example, in the case where a capacitor and a conductive film to which one electrode of the capacitor is electrically connected are used in a sensor element, interference of the potential of a conductive film of a sensor unit which is not selected with the potential of a conductive film of a selected sensor unit can be reduced. Specifically, noise is reduced.

Thus, without dependence on the size, the input/output device 500TP can drive the sensor units and supply sensing information. For example, it is possible to provide the input/output devices 500TP with various sizes ranging from the one which can be used for a handheld type device to the one which can be used for an electric blackboard.

The input/output device 500TP can be folded and unfolded. Furthermore, even in the case where electrical interference with the selected sensor unit, which is caused by the non-selected sensor units, is different between the input/output device 500TP in the folded state and the input/output device 500IP in the unfolded state, the input/output device 500TP can drive the sensor unit and supply the sensing information without depending on the state of the input/output device 500TP.

Furthermore, display information V can be supplied to the display portion 500 of the input/output device 500TP. For example, the arithmetic device can supply the display information V.

In addition to the above structure, the following structure can be included in the input/output device 500TP.

The input portion 600 of the input/output device 500TP can include a driver circuit 603g and a driver circuit 603d. The input portion 600 can be electrically connected to a flexible printed board FPC1.

The display portion 500 of the input/output device 500TP may include the signal line driver circuit 503s, a wiring 511, and a terminal 519. The display portion 500 may be electrically connected to a flexible printed board FPC2.

Furthermore, a protective layer 670 having a function of protecting the input/output device 500TP from generation of a flaw due to use can be provided. For example, a ceramic coat layer or a hard coat layer can be used as the protective layer 670. Specifically, a layer containing aluminum oxide or a layer containing a UV curable resin and the like can be used. Furthermore, an antireflective layer 670p having a function of weakening the intensity of external light which is reflected by the input/output device 500TP can be used. Specifically, a circularly polarizing plate can be used, for example.

Individual components included in the input/output device 500TP are described below. Note that these components cannot be clearly distinguished and one component also serves as another component or include part of another component in some cases.

For example, the input portion 600 including the coloring layers overlapping the plurality of window portions 667 also serves as a color filter.

For example, the input/output device 500TP where the input portion 600 overlaps with the display portion 500 serves as the input portion 600 and the display portion 500. Note that the input/output device 500TP in which the input portion 600 overlaps with the display portion 500 is also referred to as a touch panel.

<<Overall Structure>>

The input/output device 500TP described in this embodiment includes the input portion 600 and the display portion 500.

The input/output device 500'IP can be manufactured by a manufacturing method described in Embodiments 3 to 5, for example.

<<Input Portion>>

The input portion 600 includes the sensor unit 602, the first control line G1, the signal line DL, and a base material 610.

The input portion 600 can be formed by depositing films for forming the input portion 600 over the base material 610 and processing the films.

Alternatively, the input portion 600 may be formed in such a manner that part of the input portion 600 is formed over another base material, and the part is transferred to the base material 610.

<<Sensor Unit>>

The sensor unit 602 senses an object which approaches or touches the sensor unit 602 and supplies a sensing signal. For example, the sensor unit 602 senses electrostatic capacitance, illuminance, magnetic force, an electric wave, a pressure, or the like and supplies information based on the obtained physical value. Specifically, a capacitor, a photoelectric conversion element, a magnetic sensor element, a piezoelectric element, a resonator, and the like can be used as a sensor element.

The sensor unit 602 includes a sensor element and a sensor circuit. For example, the sensor unit 602 can include a sensor element and a sensor circuit that sense a change in electrostatic capacitance between the sensor unit 602 and what approaches or touches the sensor unit 602. Specifically, a conductive film and a sensor circuit electrically connected to the conductive film can be used in the sensor unit 602.

Note that when an object which has a higher dielectric constant than the air, such as a finger, approaches the conductive film in the air, electrostatic capacitance between the finger and the conductive film changes. The change in the electrostatic capacitance can be sensed, and sensing information can be supplied. Specifically, a sensor circuit including a conductive film and a capacitor one electrode of which is connected to the conductive film can be used for the sensor unit 602.

For example, distribution of charge occurs between the conductive film and the capacitor owing to the change in the electrostatic capacitance, so that the voltage across the capacitor is changed. The change in voltage can be used for a sensing signal. Specifically, the voltage between the electrodes of the capacitor 650 changes when an object approaches the conductive film which is electrically connected to one electrode of the capacitor 650 (see FIG. 6A).

<<Switch, Transistor>>

The sensor unit 602 includes a switch which can be turned on or off on the basis of a control signal. For example, a transistor M12 can be used as the switch.

A transistor which amplifies a sensing signal can be used in the sensor unit 602.

Transistors which can be formed by the same process can be used as the transistor which amplifies a sensing signal and the switch. Thus, the input portion 600 which can be manufactured by a simplified process can be provided.

The transistor includes a semiconductor layer. For example, a Group 4 element, a compound semiconductor, or an oxide semiconductor can be used for the semiconductor layer. Specifically, a semiconductor containing silicon, a semiconductor containing gallium arsenide, an oxide semiconductor containing indium, or the like can be used for the semiconductor layer. Alternatively, an organic semiconductor or the like can be used for the semiconductor layer. As the organic semiconductor, acenes such as tetracene and pentacene, oligothiophene derivatives, phthalocyanines, perylene derivatives, rubrene, Alq$_3$, TTF-TCNQ, polythiophene (e.g., poly(3-hexylthiophene) (P3HT)), polyacetylene, polyfluorene, polyphenylene vinylene, polypyrrole, polyaniline, anthracene, tetracyanoquinodimethane (TCNQ), polyparaphenylene vinylene (PPV), or the like can be used.

Transistors can include semiconductor layers with a variety of crystallinity. For example, a semiconductor layer containing non-crystal, a semiconductor layer containing microcrystal, a semiconductor layer containing polycrystal, a semiconductor layer containing single crystal, and the like can be used. Specifically, a semiconductor layer containing amorphous silicon, a semiconductor layer containing polysilicon obtained by crystallization process such as laser annealing, a semiconductor layer formed by silicon on insulator (SOI) technique, and the like can be used.

The oxide semiconductor used for the semiconductor layer preferably includes a film represented by an In—M—Zn oxide that contains at least indium (In), zinc (Zn), and M (metal such as Al, Ga, Ge, Y, Zr, Sn, La, Ce, or Hf), for example. Alternatively, both In and Zn are preferably contained.

As a stabilizer, gallium (Ga), tin (Sn), hafnium (Hf), aluminum (Al), zirconium (Zr), or the like can be used. As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be used.

As an oxide semiconductor included in an oxide semiconductor film, any of the followings can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, an In—Hf—Al—Zn-based oxide, and an In—Ga-based oxide.

Note that here, an In—Ga—Zn-based oxide means an oxide containing In, Ga, and Zn as its main components and there is no limitation on the ratio of In:Ga:Zn. The In—Ga—Zn-based oxide may contain another metal element in addition to In, Ga, and Zn.

<<Wiring>>

The input portion 600 includes the first control line G1, the control line RES, the signal line DL, and the like.

A conductive material can be used for the first control line G1, the control line RES, the signal line DL, and the like.

For example, an inorganic conductive material, an organic conductive material, metal, conductive ceramics, or the like can be used for the wiring.

Specifically, a metal element selected from aluminum, gold, platinum, silver, chromium, tantalum, titanium, molybdenum, tungsten, nickel, iron, cobalt, yttrium, zirconium, palladium, and manganese; an alloy including any of the above metal elements; an alloy including any of the above metal elements in combination; or the like can be used for the wiring. In particular, one or more elements selected from aluminum, chromium, copper, tantalum, titanium, molybdenum, and tungsten are preferably contained. In particular, an alloy of copper and manganese is suitably used in microfabrication with the use of wet etching.

Specifically, any of the following structures can be used: a two-layer structure in which a titanium film is stacked over an aluminum film; a two-layer structure in which a titanium film is stacked over a titanium nitride film; a two-layer structure in which a tungsten film is stacked over a titanium nitride film; a two-layer structure in which a tungsten film is stacked over a tantalum nitride film or a tungsten nitride film; and a three-layer structure in which a titanium film, an aluminum film, and a titanium film are stacked in that order.

Specifically, a stacked-layer film in which a film of an element selected from titanium, tantalum, tungsten, molybdenum, chromium, neodymium, and scandium is stacked over an aluminum film, a stacked-layer film in which an alloy film in which a plurality of elements selected from titanium, tantalum, tungsten, molybdenum, chromium, neodymium, and scandium are combined is stacked over an aluminum film, or a stacked-layer film in which a nitride film containing an element selected from titanium, tantalum, tungsten, molybdenum, chromium, neodymium, and scandium is stacked over an aluminum film can be used.

Alternatively, a conductive oxide such as indium oxide, indium tin oxide, indium zinc oxide, zinc oxide, or zinc oxide to which gallium is added can be used.

Alternatively, graphene or graphite can be used. A film containing graphene can be formed, for example, by reducing a film containing graphene oxide. As a reducing method, a method with application of heat, a method using a reducing agent, or the like can be used.

Alternatively, a conductive high molecule can be used.

<<Driver Circuit>>

The driver circuit 603g has a function of supplying a selection signal at a predetermined timing, for example. Specifically, the driver circuit 603g has a function of supplying selection signals to the first control lines G1 in a predetermined order. Further, any of various circuits can be used as the driver circuit 603g. For example, a combination circuit or the like of a shift register, a flip flop circuit, and the like can be used. For example, the driver circuit 603g may supply a selection signal to operate the input portion 600 on the basis of a predetermined operation of the display portion 500. Specifically, the selection signal may be supplied to operate the input portion 600 in a retrace period of the display portion 500. Thus, a problem in that the input portion 600 senses noise due to the operation of the display portion 500 can be reduced.

The driver circuit 603d supplies sensing information in accordance with a sensing signal supplied by the sensor unit 602. Any of various circuits can be used as the driver circuit 603d. For example, a circuit which can serve as a source follower circuit or a current mirror circuit by electrical connection with the sensor circuit provided in the sensor unit 602 can be used as the driver circuit 603d. Further, an analog/digital converter circuit which converts a sensing signal into a digital signal may be included.

<<Base Material>>

There is no particular limitation on the base material 610 as long as the base material 610 has heat resistance high enough to withstand a manufacturing process and a thickness and a size which can be used in a manufacturing apparatus. In particular, use of a flexible material as the base material 610 enables the input portion 600 to be folded or unfolded. Note that in the case where the input portion 600 is positioned on a side where the display portion 500 displays an image, a light-transmitting material is used as the base material 610.

For the base material 610, an organic material, an inorganic material, a composite material of an organic material and an inorganic material, or the like can be used.

For example, an inorganic material such as glass, a ceramic, or a metal can be used for the base material 610.

Specifically, non-alkali glass, soda-lime glass, potash glass, crystal glass, or the like can be used for the base material 610.

Specifically, a metal oxide film, a metal nitride film, a metal oxynitride film, or the like can be used for the base material 610. For example, silicon oxide, silicon nitride, silicon oxynitride, an alumina film, or the like can be used for the base material 610.

For example, an organic material such as a resin, a resin film, or plastic can be used for the base material 610.

Specifically, a resin film or resin plate of polyester, polyolefin, polyamide, polyimide, polycarbonate, an acrylic resin, or the like can be used for the base material 610.

For example, a composite material such as a resin film to which a thin glass plate or a film of an inorganic material is attached can be used as the base material 610.

For example, a composite material formed by dispersing a fibrous or particulate metal, glass, inorganic material, or the like into a resin film can be used as the base material 610.

For example, a composite material formed by dispersing a fibrous or particulate resin, organic material, or the like into an inorganic material can be used as the base material 610.

A single-layer material or a stacked-layer material in which a plurality of layers are stacked can be used for the base material 610. For example, a stacked-layer material including a base material and an insulating layer that prevents diffusion of impurities contained in the base material can be used for the base material 610.

Specifically, a stacked-layer material in which glass and one or a plurality of films that prevent diffusion of impurities contained in the glass and that are selected from a silicon oxide film, a silicon nitride film, a silicon oxynitride film, and the like are stacked can be used for the base material 610.

Alternatively, a stacked-layer material in which a resin and a film that prevents diffusion of impurities contained in the resin, such as a silicon oxide film, a silicon nitride film, a silicon oxynitride film, and the like are stacked can be used for the base material 610.

Specifically, a stack including a base material 610*b* having flexibility, a barrier film 610*a* inhibiting diffusion of impurities, and a resin layer 610*c* attaching the base material 610*b* to the barrier film 610*a* can be used (see FIG. 6A).

<<Flexible Printed Board>>

The flexible printed circuit board FPC1 supplies a timing signal, a power supply potential, and the like, and is supplied with a sensing signal.

<<Display Portion>>

The display portion 500 includes the pixel 502, scan lines, signal lines, and a base material 510 (see FIG. 5).

Note that the display portion 500 may be formed in such a manner that films for forming the display portion 500 are deposited over the base material 510 and the films are processed.

The display portion 500 may be formed in such a manner that part of the display portion 500 is formed over another base material and the part is transferred to the base material 510.

<<Pixel>>

The pixel 502 includes a sub-pixel 502B, a sub-pixel 502G, and a sub-pixel 502R, and each sub-pixel includes a display element and a pixel circuit for driving the display element.

<<Pixel Circuit>>

An active matrix method in which an active element is included in a pixel or a passive matrix method in which an active element is not included in a pixel can be employed for the display portion.

In an active matrix method, as an active element (a non-linear element), not only a transistor but also various active elements (non-linear elements) can be used. For example, an MIM (metal insulator metal), a TFD (thin film diode), or the like can also be used. Since such an element has few numbers of manufacturing steps, manufacturing cost can be reduced or yield can be improved. Alternatively, since the size of the element is small, the aperture ratio can be improved, so that power consumption can be reduced or higher luminance can be achieved.

As a method other than the active matrix method, the passive matrix method in which an active element (a non-linear element) is not used can also be used. Since an active element (a non-linear element) is not used, the number of manufacturing steps is small, so that manufacturing cost can be reduced or yield can be improved. Alternatively, since an active element (a non-linear element) is not used, the aperture ratio can be improved, so that power consumption can be reduced or higher luminance can be achieved, for example.

The pixel circuit includes a transistor 502*t*, for example.

The display portion 500 includes an insulating film 521 covering the transistor 502*t*. The insulating film 521 can be used as a layer for planarizing unevenness caused by the pixel circuit. A stacked-layer film including a layer that can prevent diffusion of impurities can be used as the insulating film 521. This can prevent the reliability of the transistor 502*t* or the like from being lowered by diffusion of unintentional impurities.

<<Display Element>>

Various display elements can be used for the display portion 500. For example, display elements (electronic ink) that perform display by an electrophoretic method, an electronic liquid powder (registered trademark) method, an electrowetting method, or the like, MEMS shutter display elements, optical interference type MEMS display elements, and liquid crystal elements can be used.

Alternatively, display elements which can be used for a transmissive liquid crystal display, a transflective liquid crystal display, a reflective liquid crystal display, a direct-view liquid crystal display, and the like can be used.

For example, organic electroluminescent elements that emit light of different colors may be included in sub-pixels.

For example, an organic electroluminescence element which emits white light can be used.

For example, a light-emitting element 550R includes a lower electrode, an upper electrode, and a layer containing a light-emitting organic compound between the lower electrode and the upper electrode.

The sub-pixel 502R includes a light-emitting module 580R. The sub-pixel 502R includes the light-emitting element 550R and the pixel circuit that can supply power to the light-emitting element 550R and includes the transistor 502*t*.

Furthermore, the light-emitting module 580R includes the light-emitting element 550R and an optical element (e.g., the coloring layer CFR).

Note that to efficiently extract light having a certain wavelength, a microresonator structure may be provided in the light-emitting module 580R. Specifically, a layer containing a light-emitting organic compound may be provided between a film which reflects visible light which is provided to efficiently extract certain light and a semi-transmissive and semi-reflective film.

The light-emitting module 580R includes the coloring layer CFR on the light extraction side. The coloring layer transmits light of a particular wavelength and is, for example, a layer that selectively transmits light of red, green, or blue color. Note that other sub-pixels may be provided so as to overlap with the window portions, which are not provided with the coloring layers, so that light from the light-emitting element can be emitted without passing through the coloring layers.

The coloring layer CFR is positioned in a region overlapping with the light-emitting element 550R. Accordingly, part of light emitted from the light-emitting element 550R passes through the coloring layer CFR and is emitted to the outside of the light-emitting module 580R as indicated by an arrow in FIG. 6A.

The light-blocking layer BM is located so as to surround the coloring layer (e.g., the coloring layer CFR).

Note that in the case where a sealant 560 is provided on a side from which light is extracted, the sealant 560 may be in contact with the light-emitting element 550R and the coloring layer CFR.

The lower electrode is provided over the insulating film 521. A partition 528 with an opening overlapping the lower electrode is provided. Note that part of the partition 528 overlaps an end portion of the lower electrode.

The lower electrode is included in the light-emitting element (e.g., the light-emitting element 550R); the layer containing a light-emitting organic compound is provided between the upper electrode and the lower electrode. The pixel circuit supplies power to the light-emitting element.

Over the partition 528, a spacer that controls the gap between the base material 610 and the base material 510 is provided.

In the case of a transflective liquid crystal display or a reflective liquid crystal display, some of or all of pixel electrodes function as reflective electrodes. For example, some or all of pixel electrodes are formed to contain aluminum, silver, or the like.

A memory circuit such as an SRAM can be provided under the reflective electrodes. Thus, the power consumption can be further reduced. A structure suitable for employed display elements can be selected from among a variety of structures of pixel circuits.

<<Base Material>>

A flexible material can be used for the base material 510. For example, a material which is similar to the material that can be used for the base material 610 can be used for the base material 510.

Note that in the case where the base material 510 need not have a light-emitting property, for example, a material which does not have a light-emitting property, specifically, SUS, aluminum, or the like, can be used.

A stack in which a flexible base 510b, a barrier film 510a that prevents diffusion of impurities, and a resin layer 510c that bonds the barrier film 510a to the base 510b are stacked can be favorably used for the base 510, for example (see FIG. 6A).

<<Sealant>>

The sealant 560 has a function of bonding the base material 610 to the base material 510. The sealant 560 has a refractive index higher than that of air. In the case where light emitted from the light-emitting element 550R is extracted to the side on which the coloring layer CFR is provided, for the sealant 560, a material having a function of optically bonding the light-emitting element 550R to the coloring layer CFR can be used. For example, a material that can be used for the sealant 560 is a material whose refractive index is higher than that of air, preferably a material whose refractive index is higher than or equal to 1.1, further preferably a material whose refractive index is higher than or equal to 1.2.

Note that the pixel circuits and the light-emitting elements (e.g., a light-emitting element 550R) are provided between the base material 510 and the base material 610.

<<Configuration of Signal Line Driver Circuit>>

The signal line driver circuit 503s supplies an image signal. The signal line driver circuit 503s includes a transistor 503t and a capacitor 503c, for example. Note that transistors that can be formed in the same process and over the same substrate as those of the pixel circuit can be used in the driver circuit.

<<Wiring>>

The display portion 500 includes wirings such as scan lines, signal lines, and power supply lines. Various conductive films can be used. For example, a material similar to that of the conductive film that can be used for the wiring of the input portion 600 can be used.

The display portion 500 includes the wiring 511 through which a signal can be supplied. In addition, the terminal 519 electrically connected to the wiring 511 is provided. Note that the flexible printed substrate FPC2 through which a signal such as an image signal or a synchronization signal can be supplied can be electrically connected to the terminal 519.

Note that a printed wiring board (PWB) may be attached to the flexible printed substrate FPC2.

<<Other Component>>

The input/output device 500TP includes the antireflective layer 670p positioned in a region overlapping with the pixel. As the antireflective layer 670p, a circular polarizing plate can be used, for example.

<Modification Example of Input/Output Device>

Various transistors can be used for the input portion 600 and/or the display portion 500.

FIG. 6A illustrates a structure in which a bottom-gate transistor is used for the input portion 600.

A structure of the case of using bottom-gate transistors in the display portion 500 is illustrated in FIGS. 6A and 6B.

For example, a semiconductor layer containing an oxide semiconductor, amorphous silicon, or the like can be used in the transistor 502t and the transistor 503t illustrated in FIG. 6A.

For example, a semiconductor layer containing polycrystalline silicon that is obtained by crystallization process such as laser annealing can be used in the transistor 502t and the transistor 503t illustrated in FIG. 6B.

A structure in the case of using top-gate transistors in the display portion 500 is illustrated in FIG. 6C.

For example, a semiconductor layer containing polycrystalline silicon, a single crystal silicon film that is transferred from a single crystal silicon substrate, or the like can be used in the transistor 502t and the transistor 503t illustrated in FIG. 6C.

This embodiment can be combined with any of the other embodiments in this specification as appropriate.

(Embodiment 3)

In this embodiment, a method of manufacturing a stack that can be used in the manufacture of the input portion, display portion, or input/output device of one embodiment of the present invention is described with reference to FIGS. 7A1 to 7E2.

FIGS. 7A1 to 7E2 are schematic views illustrating a process of manufacturing the stack. Cross-sectional views illustrating structures of a processed member and the stack are shown on the left side of FIGS. 7A1 to 7E2, and top views corresponding to the cross-sectional views except FIG. 7C are shown on the right side.

<Method of Manufacturing Stack>

A method of manufacturing a stack 81 from a processed member 80 is described with reference to FIGS. 7A1 to 7E2.

The processed member 80 includes a first substrate F1, a first separation layer F2 on the first substrate F1, a first layer F3 to be separated whose one surface is in contact with the first separation layer F2, a bonding layer 30 whose one surface is in contact with the other surface of the first layer F3 to be separated, and a base layer S5 in contact with the other surface of the bonding layer 30 (see FIGS. 7A1 and 7A2).

Note that a structure of the processed member 80 is described in detail in Embodiment 5.

<<Formation of Separation Starting Points>>

The processed member 80 in which separation starting points F3s are formed in the vicinity of edges of the bonding layer 30 is prepared.

The separation starting points F3s are formed by separating part of the first layer F3 to be separated, from the first substrate F1.

Part of the first layer F3 to be separated can be separated from the separation layer F2 by inserting a sharp tip into the first layer F3 to be separated, from the first substrate F1 side, or by a method using a laser or the like (e.g., a laser ablation method). Thus, the separation starting point F3s can be formed.

<<First Step>>

The processed member 80 in which the separation starting points F3s are formed in the vicinity of the edges of the bonding layer 30 in advance is prepared (see FIGS. 7B1 and 7B2).

<<Second Step>>

One surface layer 80b of the processed member 80 is separated. As a result, a first remaining portion 80a is obtained from the processed member 80.

Specifically, from the separation starting point F3s formed in the vicinity of the edge of the bonding layer 30, the first substrate F1, together with the first separation layer F2, is separated from the first layer F3 to be separated (see FIG. 7C). Consequently, the first remaining portion 80a including the first layer F3 to be separated, the bonding layer 30 whose one surface is in contact with the first layer F3 to be separated, and the base layer S5 in contact with the other surface of the bonding layer 30 is obtained.

The separation may be performed while the vicinity of the interface between the first separation layer F2 and the first layer F3 to be separated is irradiated with ions to remove static electricity. Specifically, the ions may be generated by an ionizer.

Furthermore, when the first layer F3 to be separated is separated from the first separation layer F2, a liquid is injected into the interface between the first separation layer F2 and the first layer F3 to be separated. Alternatively, a liquid may be ejected and sprayed by a nozzle 99. For example, as the injected liquid or the sprayed liquid, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing tungsten oxide is used as the first separation layer F2, the first layer F3 to be separated is preferably separated while a liquid containing water is injected or sprayed because a stress applied to the first layer F3 to be separated due to the separation can be reduced.

<<Third Step>>

A first adhesive layer 31 is formed on the first remaining portion 80a (see FIGS. 7D1 and 7D2), and the first remaining portion 80a is bonded to a first support 41 with the first adhesive layer 31. Consequently, the stack 81 is obtained from the first remaining portion 80a.

Specifically, the stack 81 including the first support 41, the first adhesive layer 31, the first layer F3 to be separated, the bonding layer 30 whose one surface is in contact with the first layer F3 to be separated, and the base layer S5 in contact with the other surface of the bonding layer 30 is obtained (see FIGS. 7E1 and 7E2).

To form the bonding layer 30, any of a variety of methods can be used. For example, the bonding layer 30 can be formed with a dispenser, by a screen printing method, or the like. The bonding layer 30 is cured by a method selected depending on its material. For example, when a light curable adhesive is used for the bonding layer 30, light including light of a predetermined wavelength is emitted.

This embodiment can be combined with any of the other embodiments described in this specification as appropriate.

(Embodiment 4)

In this embodiment, a method of manufacturing a stack that can be used in the manufacture of the input portion, display portion, or input/output device of one embodiment of the present invention is described with reference to FIGS. 8A1 to 8E2 and FIGS. 9A1 to 9E2.

FIGS. 8A1 to 8E2 and FIGS. 9A1 to 9E2 are schematic views illustrating a process of manufacturing the stack. Cross-sectional views illustrating structures of a processed member and the stack are shown on the left side of FIGS. 8A1 to 8E2 and FIGS. 9A1 to 9E2, and top views corresponding to the cross-sectional views except FIG. 8C and FIGS. 9B and 9C are shown on the right side.

<Method of Manufacturing Stack>

A method of manufacturing a stack 92 from a processed member 90 is described with reference to FIGS. 8A1 to 8E2 and FIGS. 9A1 to 9E2.

The processed member 90 is different from the processed member 80 in that the other surface of the bonding layer 30 is in contact with one surface of a second layer S3 to be separated instead of the material S5.

Specifically, the difference is that the second substrate S1 instead of the base layer S5, a second separation layer S2 over the second substrate S1, and the second layer S3 to be separated whose other surface is in contact with the second separation layer S2 are included, and that one surface of the second layer S3 to be separated is in contact with the other surface of the bonding layer 30.

In the processed member 90, the first substrate F1, the first separation layer F2, the first layer F3 to be separated whose one surface is in contact with the first separation layer F2, the bonding layer 30 whose one surface is in contact with the other surface of the first layer F3 to be separated, the second layer S3 to be separated whose one surface is in contact with the other surface of the bonding layer 30, the second separation layer S2 whose one surface is in contact with the other surface of the second layer S3 to be separated, and the second substrate S1 are placed in this order (see FIGS. 8A1 and 8A2).

Note that a structure of the processed member 90 is described in detail in Embodiment 5.

<<First Step>>

The processed member 90 in which the separation starting points F3s are formed in the vicinity of the edges of the bonding layer 30 is prepared (see FIGS. 8B1 and 8B2).

The separation starting point F3s is formed by separating part of the first layer F3 to be separated, from the first substrate F1.

For example, part of the first layer F3 to be separated can be separated from the separation layer F2 by inserting a sharp tip into the first layer F3 to be separated, from the first substrate F1 side, or by a method using a laser or the like (e.g., a laser ablation method). Thus, the separation starting point F3s can be formed.

<<Second Step>>

One surface layer 90b of the processed member 90 is separated. As a result, a first remaining portion 90a is obtained from the processed member 90.

Figure 8C:
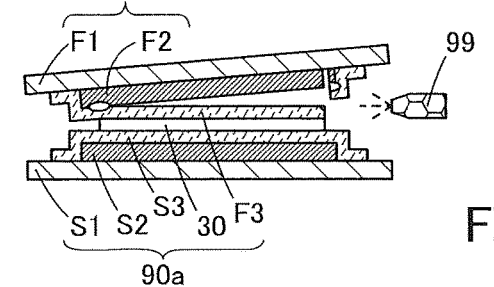

Specifically, from the separation starting point F3s formed in the vicinity of the edge of the bonding layer 30, the first substrate F1, together with the first separation layer F2, is separated from the first layer F3 to be separated (see FIG. 8C). Consequently, the first remaining portion 90a in which the first layer F3 to be separated, the bonding layer 30 whose one surface is in contact with the first layer F3 to be separated, the second layer S3 to be separated whose one surface is in contact with the other surface of the bonding layer 30, the second separation layer S2 whose one surface is in contact with the other surface of the second layer S3 to be separated, and the second substrate S1 are placed in this order is obtained.

Note that the separation may be performed while the vicinity of the interface between the second separation layer S2 and the second layer S3 to be separated is irradiated with ions to remove static electricity. Specifically, the ions may be generated by an ionizer.

Furthermore, when the second layer S3 to be separated is separated from the second separation layer S2, a liquid is injected into the interface between the second separation layer S2 and the second layer S3 to be separated. Alternatively, a liquid may be ejected and sprayed by a nozzle 99. For example, as the liquid to be injected or the liquid to be sprayed, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing tungsten oxide is used as the second separation layer S2, the second layer S3 to be separated is preferably separated while a liquid containing water is injected or sprayed because a stress applied to the second layer S3 to be separated due to the separation can be reduced.

<<Third Step>>

A first adhesive layer 31 is formed on the first remaining portion 90a (see FIGS. 8D1 and 8D2), and the first remaining portion 90a is bonded to a first support 41 with the first adhesive layer 31. Consequently, a stack 91 is obtained from the first remaining portion 90a.

Specifically, the stack 91 in which the first support 41, the first adhesive layer 31, the first layer F3 to be separated, the bonding layer 30 whose one surface is in contact with the first layer F3 to be separated, the second layer S3 to be separated whose one surface is in contact with the other surface of the bonding layer 30, the second separation layer S2 whose one surface is in contact with the other surface of the second layer S3 to be separated, and the second substrate S1 are placed in this order is obtained (see FIGS. 8E1 and 8E2).

<<Fourth Step>>

Part of the second layer S3 to be separated in the vicinity of the edge of the first adhesive layer 31 of the stack 91 is separated from the second substrate S1 to form a second separation starting point 91s.

For example, the first support 41 and the first adhesive layer 31 are cut from the first support 41 side, and part of the second layer S3 to be separated is separated from the second substrate S1 along an edge of the first adhesive layer 31 which is newly formed.

Specifically, the first adhesive layer 31 and the first support 41 in a region which is over the second separation layer S2 and in which the second layer S3 to be separated is provided are cut with a blade or the like including a sharp tip, and along a newly formed edge of the first adhesive layer 31, the second layer S3 to be separated is partly separated from the second substrate S1 (see FIGS. 9A1 and 9A2).

Consequently, the separation starting points 91s are formed in the vicinity of newly formed edges of the first support 41b and the first adhesive layer 31.

<<Fifth Step>>

A second remaining portion 91a is separated from the stack 91. As a result, the second remaining portion 91a is obtained from the stack 91 (see FIG. 9C).

Specifically, from the separation starting point 91s formed in the vicinity of the edge of the first adhesive layer 31, the second substrate S1, together with the second separation layer S2, is separated from the second layer S3 to be separated. Consequently, the second remaining portion 91a in which the first support 41b, the first adhesive layer 31, the first layer F3 to be separated, the bonding layer 30 whose one surface is in contact with the first layer F3 to be separated, and the second layer S3 to be separated whose one surface is in contact with the other surface of the bonding layer 30 are placed in this order is obtained.

Note that the separation may be performed while the vicinity of the interface between the second separation layer S2 and the second layer S3 to be separated is irradiated with ions to remove static electricity. Specifically, the ions may be generated by an ionizer.

Furthermore, when the second layer S3 to be separated is separated from the second separation layer S2, a liquid is injected into the interface between the second separation layer S2 and the second layer S3 to be separated. Alternatively, a liquid may be ejected and sprayed by a nozzle 99. For example, as the liquid to be injected or the liquid to be sprayed, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing tungsten oxide is used as the second separation layer S2, the second layer S3 to be separated is preferably separated while a liquid containing water is injected or sprayed because a stress applied to the second layer S3 to be separated due to the separation can be reduced.

<<Sixth Step>>

A second adhesive layer 32 is formed on the second remaining portion 91a (see FIGS. 9D1 and 9D2).

The second remaining portion 91a is bonded to the second support 42 with the second adhesive layer 32. Consequently, a stack 92 is obtained from the second remaining portion 91a (see FIGS. 9E1 and 9E2).

Specifically, the stack 92 in which first support 41b, the first adhesive layer 31, the first layer F3 to be separated, the bonding layer 30 whose one surface is in contact with the first layer F3 to be separated, the second layer S3 to be separated whose one surface is in contact with the other surface of the bonding layer 30, the second adhesive layer 32, and the second support 42 are placed in this order is obtained.

<Method of Manufacturing Stack Including Opening Portion in Support>

A method of manufacturing a stack including an opening portion in a support is described with reference to FIGS. 10A1 to 10D2.

FIGS. 10A1 to 10D2 illustrate the method of manufacturing a stack including an opening portion which exposes part of a layer to be separated in a support. Cross-sectional views illustrating structures of the stack are shown on the left side of FIGS. 10A1 to 10D2, and top views corresponding to the cross-sectional views are shown on the right side.

FIGS. 10A1 to 10B2 illustrate a method of manufacturing a stack 92c comprising an opening portion by using a second support 42b which is smaller than the first support 41b.

FIGS. 10C1 to 10D2 illustrate a method of manufacturing a stack 92d comprising an opening portion formed in the second support 42.

<<Example 1 of Method of Manufacturing Stack Comprising Opening Portion in Support>>

A method of manufacturing a stack has the same step as the above sixth step except that the second support 42b which is smaller than the first support 41b is used instead of the second support 42. By this method, a stack in which part of the second layer S3 to be separated is exposed can be manufactured (see FIGS. 10A1 and 10A2).

As the second adhesive layer 32, a liquid adhesive can be used. Alternatively, an adhesive whose fluidity is inhibited and which is formed in a single wafer shape in advance (also referred to as a sheet-like adhesive) can be used. By using the sheet-like adhesive, the amount of part of the adhesive layer 32 which extends beyond the second support 42b can be small. In addition, the adhesive layer 32 can have a uniform thickness easily.

Part of the exposed part of the second layer S3 to be separated is cut off, and the first layer F3 to be separated may be exposed (see FIGS. 10B1 and 10B2).

Specifically, with a blade or the like which has a sharp tip, a slit is formed in the exposed second layer S3 to be separated. Then, for example, an adhesive tape or the like is attached to part of the exposed second layer S3 to be separated to concentrate stress near the slit, and the part of the exposed second layer S3 to be separated is separated together with the attached tape or the like, whereby the part of the second layer S3 to be separated can be selectively removed.

Moreover, a layer which can suppress the bonding power of the bonding layer 30 to the first layer F3 to be separated may be selectively formed on part of the first layer F3 to be separated. For example, a material which is not easily bonded to the bonding layer 30 may be selectively formed. Specifically, an organic material may be deposited into an island shape. Thus, part of the bonding layer 30 can be selectively removed together with the second layer S3 to be separated easily. As a result, the first layer F3 to be separated can be exposed.

Note that for example, in the case where the first layer F3 to be separated includes a functional layer and a conductive layer F3b electrically connected to the functional layer, the conductive layer F3b can be exposed in an opening portion in the second stack 92c. Thus, the conductive layer F3b exposed in the opening portion can be used as a terminal supplied with a signal.

As a result, the conductive layer F3b part of which is exposed in the opening portion can be used as a terminal that can extract a signal supplied though the functional layer, or can be used as a terminal to which a signal supplied to the functional layer can be supplied by an external device.

<<Example 2 of Method of Manufacturing Stack Comprising Opening Portion in Support>>

A mask 48 comprising an opening portion formed to overlap with an opening portion formed in the second support 42 is formed on the stack 92. Next, a solvent 49 is dropped into the opening portion in the mask 48. Thus, with the solvent 49, the second support 42 exposed in the opening portion in the mask 48 can be swelled or dissolved (see FIGS. 10C1 and 10C2).

After the extra solvent 49 is removed, stress is applied by, for example, rubbing the second support 42 exposed in the opening portion in the mask 48. Thus, the second support 42 or the like in a portion overlapping with the opening portion in the mask 48 can be removed.

Moreover, with a solvent with which the bonding layer 30 is swelled or dissolved, the first layer F3 to be separated can be exposed (see FIGS. 10D1 and 10D2).

This embodiment can be combined with any of the other embodiments described in this specification as appropriate.

(Embodiment 5)

In this embodiment, a structure of a processed member that can be processed into the input portion, display portion, or input/output device of one embodiment of the present invention is described with reference to FIGS. 11A1 to 11B2.

FIGS. 11A1 to 11B2 are schematic views illustrating a structure of a processed member that can be processed into the stack.

FIG. 11A1 is a cross-sectional view illustrating a structure of the processed member 80 which can processed into the stack, and FIG. 11A2 is a top view corresponding to the cross-sectional view.

FIG. 11B1 is a cross-sectional view illustrating a structure of the processed member 90 which can processed into the stack, and FIG. 11B2 is a top view corresponding to the cross-sectional view.

<Structure Example 1 of Processed Member>

The processed member 80 includes a first substrate F1, the first separation layer F2 on the first substrate F1, the first layer F3 to be separated whose one surface is in contact with the first separation layer F2, the bonding layer 30 whose one surface is in contact with the other surface of the first layer F3 to be separated, and the base layer S5 in contact with the other surface of the bonding layer 30 (see FIGS. 11A1 and 11A2).

Note that the separation starting points F3s may be formed in the vicinity of the edges of the bonding layer 30.

<<First Substrate>>

There is no particular limitation on the first substrate F1 as long as it has heat resistance high enough to withstand a manufacturing process and a thickness and a size which can be used in a manufacturing apparatus.

For the first substrate F1, an organic material, an inorganic material, a composite material of an organic material and an inorganic material, or the like can be used.

For example, an inorganic material such as glass, ceramic, or metal, can be used for the first substrate F1.

Specifically, non-alkali glass, soda-lime glass, potash glass, crystal glass, or the like can be used for the first substrate F1.

Specifically, a metal oxide film, a metal nitride film, a metal oxynitride film, or the like can be used for the first substrate F1. For example, silicon oxide, silicon nitride, silicon oxynitride, an alumina film, or the like can be used for the first substrate F1.

Specifically, SUS, aluminum, or the like can be used for the first substrate F1.

For example, an organic material such as a resin, a resin film, or a plastic can be used for the first substrate F1.

Specifically, a resin film or a resin plate of polyester, polyolefin, polyamide, polyimide, polycarbonate, an acrylic resin, or the like can be used for the first substrate F1.

For example, a composite material such as a resin film to which a metal plate, a thin glass plate, or a film of an inorganic material is attached can be used as the first substrate F1.

For example, a composite material formed by dispersing a fibrous or particulate metal, glass, inorganic material, or the like into a resin film can be used as the first substrate F1.

For example, a composite material formed by dispersing a fibrous or particulate resin, organic material, or the like into an inorganic material can be used as the first substrate F1.

For the first substrate F1, a single-layer material or a stacked-layer material in which a plurality of layers are stacked can be used. For example, a stacked-layer material in which a base layer, an insulating layer that prevents diffusion of impurities contained in the base layer, and the like are stacked can be used for the first substrate F1.

Specifically, a stacked-layer material in which glass and one or a plurality of films that prevents diffusion of impurities contained in the glass and that are selected from a silicon oxide film, a silicon nitride film, a silicon oxynitride film, and the like are stacked can be used for the first substrate F1.

Alternatively, a stacked-layer material in which a resin and a film that prevents diffusion of impurities contained in the resin, such as a silicon oxide film, a silicon nitride film, and a silicon oxynitride film are stacked can be used for the first substrate F1.

<<First Separation Layer>>

The first separation layer F2 is provided between the first substrate F1 and the first layer F3 to be separated. In the vicinity of the first separation layer F2, a boundary where the first layer F3 to be separated can be separated from the first substrate F1 is formed. There is no particular limitation on the first separation layer F2 as long as it has heat resistance high enough to withstand the manufacturing process of the first layer F3 to be separated formed thereon.

For the first separation layer F2, for example, an inorganic material, an organic resin, or the like can be used.

Specifically, an inorganic material such as a metal containing an element selected from tungsten, molybdenum, titanium, tantalum, niobium, nickel, cobalt, zirconium, zinc, ruthenium, rhodium, palladium, osmium, iridium, and silicon, an alloy containing the element, or a compound containing the element can be used for the first separation layer F2.

Specifically, an organic material such as polyimide, polyester, polyolefin, polyamide, polycarbonate, or an acrylic resin can be used.

For example, a single-layer material or a stacked-layer material in which a plurality of layers are stacked can be used for the first separation layer F2.

Specifically, a material in which a layer containing tungsten and a layer containing an oxide of tungsten are stacked can be used for the first separation layer F2.

The layer containing an oxide of tungsten can be formed by a method in which another layer is stacked on a layer containing tungsten. Specifically, the layer containing an oxide of tungsten may be formed by a method in which silicon oxide, silicon oxynitride, or the like is stacked on a layer containing tungsten.

The layer containing an oxide of tungsten may be formed by subjecting a surface of a layer containing tungsten to thermal oxidation treatment, oxygen plasma treatment, nitrous oxide ($N_2O$) plasma treatment, treatment with a solution with high oxidizing power (e.g., ozone water), or the like.

Specifically, a layer containing polyimide can be used as the first separation layer F2. The layer containing polyimide has heat resistance high enough to withstand the various manufacturing steps required to form the first layer F3 to be separated.

For example, the layer containing polyimide has heat resistance of 200° C. or higher, preferably 250° C. or higher, more preferably 300° C. or higher, still more preferably 350° C. or higher.

By heating a film containing a monomer formed on the first substrate F1, a film containing polyimide obtained by condensation of the monomer can be used.

<<First Layer to be Separated>>

There is no particular limitation on the first layer F3 to be separated as long as it can be separated from the first substrate F1 and has heat resistance high enough to withstand the manufacturing process.

The boundary where the first layer F3 to be separated can be separated from the first substrate F1 may be formed between the first layer F3 to be separated and the first separation layer F2 or may be formed between the first separation layer F2 and the first substrate F1.

In the case where the boundary is formed between the first layer F3 to be separated and the first separation layer F2, the first separation layer F2 is not included in the stack. In the case where the boundary is formed between the first separation layer F2 and the first substrate F1, the first separation layer F2 is included in the stack.

An inorganic material, an organic material, a single-layer material, a stacked-layer material in which a plurality of layers are stacked, or the like can be used for the first layer F3 to be separated.

For example, an inorganic material such as a metal oxide film, a metal nitride film, or a metal oxynitride film can be used for the first layer F3 to be separated.

Specifically, silicon oxide, silicon nitride, silicon oxynitride, an alumina film, or the like can be used for the first layer F3 to be separated.

Specifically, a resin, a resin film, plastic, or the like can be used for the first layer F3 to be separated.

Specifically, a polyimide film or the like can be used for the first layer F3 to be separated.

For example, a material having a structure in which a functional layer overlapping with the first separation layer F2 and an insulating layer that is provided between the first separation layer F2 and the functional layer and can prevent diffusion of impurities which impairs the function of the functional layer are stacked can be used.

Specifically, a 0.7-mm-thick glass plate is used as the first substrate F1, and a stacked-layer material in which a 200-nm-thick silicon oxynitride film and a 30-nm-thick tungsten film are stacked in this order from the first substrate F1 side is used for the first separation layer F2. In addition, a film including a stacked-layer material in which a 600-nm-thick silicon oxynitride film and a 200-nm-thick silicon nitride film are stacked in this order from the first separation layer F2 side can be used as the first layer F3 to be separated. Note that a silicon oxynitride film refers to a film that includes more oxygen than nitrogen, and a silicon nitride oxide film refers to a film that includes more nitrogen than oxygen.

Specifically, instead of the above first layer F3 to be separated, a film including a stacked-layer material of a 600-nm-thick silicon oxynitride film, a 200-nm-thick silicon nitride film, a 200-nm-thick silicon oxynitride film, a 140-nm-thick silicon nitride oxide film, and a 100-nm-thick silicon oxynitride film stacked in this order from the first separation layer F2 side can be used as the first layer F3 to be separated.

Specifically, a stacked-layer material in which a polyimide film, a layer containing silicon oxide, silicon nitride, or the like and the functional layer are stacked in this order from the first separation layer F2 side can be used.

<<Functional Layer>>

The functional layer is included in the first layer F3 to be separated.

For example, a functional circuit, a functional element, an optical element, a functional film, or a layer including a plurality of elements selected from these can be used as the functional layer.

Specifically, a display element that can be used for a display device, a pixel circuit driving the display element, a driver circuit driving the pixel circuit, a color filter, a moisture-proof film, and the like, and a layer including two or more selected from these can be given.

<<Bonding Layer>>

There is no particular limitation on the bonding layer 30 as long as it bonds the first layer F3 to be separated and the base layer S5 to each other.

For the bonding layer 30, an inorganic material, an organic material, a composite material of an inorganic material and an organic material, or the like can be used.

For example, a glass layer with a melting point of 400° C. or lower, preferably 300° C. or lower, an adhesive, or the like can be used.

For example, an organic material such as a light curable adhesive, a reactive curable adhesive, a thermosetting adhesive, and/or an anaerobic adhesive can be used for the bonding layer 30.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin, or the like can be used.

<<Base Layer>>

There is no particular limitation on the base layer S5 as long as it has heat resistance high enough to withstand a manufacturing process and a thickness and a size which can be used in a manufacturing apparatus.

A material that can be used for the base layer S5 can be the same as that of the first substrate F1, for example.

<<Separation Starting Point>>

In the processed member 80, the separation starting point F3s may be formed in the vicinity of the edges of the bonding layer 30.

The separation starting point F3s is formed by separating part of the first layer F3 to be separated, from the first substrate F1.

Part of the first layer F3 to be separated can be separated from the separation layer F2 by inserting a sharp tip into the first layer F3 to be separated, from the first substrate F1 side, or by a method using a laser or the like (e.g., a laser ablation method). Thus, the separation starting point F3s can be formed.

<Structure Example 2 of Processed Member>

A structure of the processed member that can be the stack and is different from the above is described with reference to FIGS. 11B1 and 11B2.

The processed member 90 is different from the processed member 80 in that the other surface of the bonding layer 30 is in contact with one surface of the second layer S3 to be separated instead of the material S5.

Specifically, the processed member 90 includes the first substrate F1 on which the first separation layer F2 and the first layer F3 to be separated whose one surface is in contact with the first separation layer F2 are faulted, the second substrate S1 on which the second separation layer S2 and the second layer S3 to be separated whose other surface is in contact with the second separation layer S2 are formed, and the bonding layer 30 whose one surface is in contact with the other surface of the first layer F3 to be separated and whose other surface is in contact with the one surface of the second layer S3 to be separated (see FIGS. 11B1 and 11B2).

<<Second Substrate>>

As the second substrate S1, a substrate similar to the first substrate F1 can be used. Note that the second substrate S1 does not necessarily have the same structure as the first substrate F1.

<<Second Separation Layer>>

For the second separation layer S2, a structure similar to that of the first separation layer F2 can be used. For the second separation layer S2, a structure different from that of the first separation layer F2 can also be used.

<<Second Layer to be Separated>>

As the second layer S3 to be separated, a structure similar to that of the first layer F3 to be separated can be used. For the second layer S3 to be separated, a structure different from that of the first layer F3 to be separated can also be used.

Specifically, a structure may be employed in which the first layer F3 to be separated includes a functional circuit and the second layer S3 to be separated includes a functional layer that prevents diffusion of impurities into the functional circuit.

Specifically, a structure may be employed in which the first layer F3 to be separated includes a light-emitting element that emits light to the second layer S3 to be separated, a pixel circuit driving the light-emitting element, and a driver circuit driving the pixel circuit, and the second layer S3 to be separated includes a color filter that transmits part of light emitted from the light-emitting element and a moisture-proof film that prevents diffusion of impurities into the light-emitting element. Note that the processed member with such a structure can be used for a stack that can be used as a flexible display device.

This embodiment can be combined with any of the other embodiments described in this specification as appropriate.

(Embodiment 6)

In this embodiment, a structure of an information processing device of one embodiment of the present invention will be described with reference to FIGS. 12A to 12C.

Figure 12A:
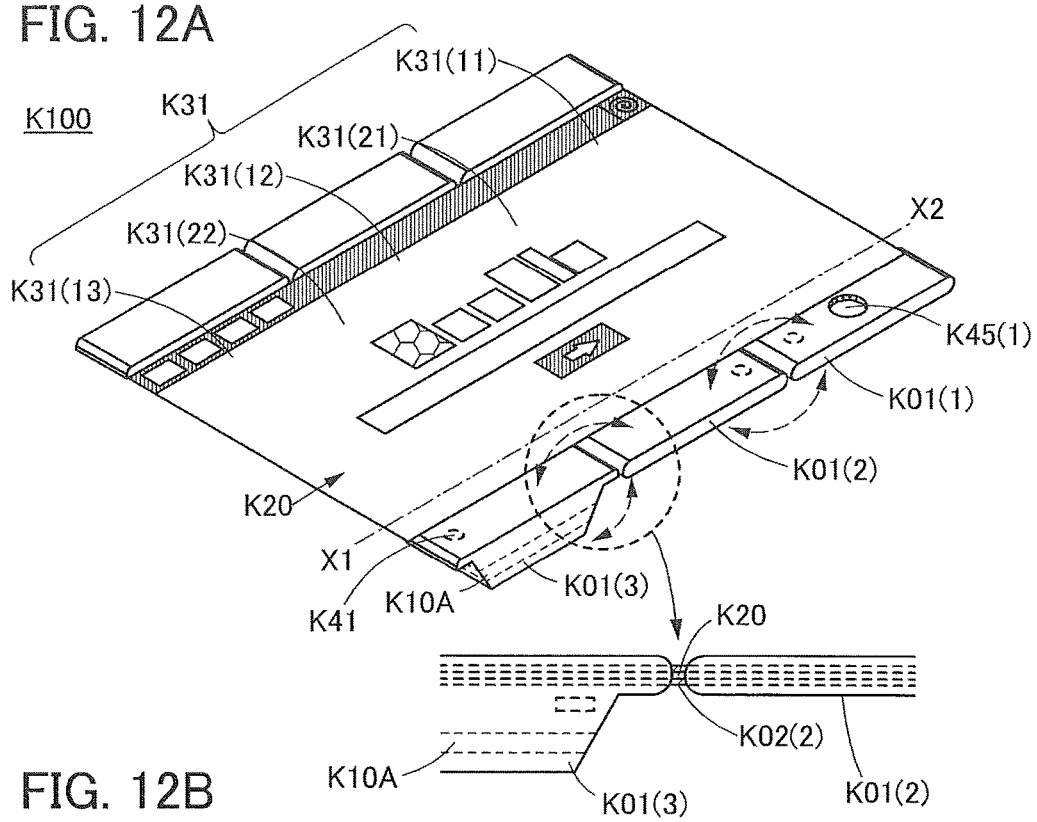
FIGS. 12A to 12C are projection views illustrating a structure of an information processing device of an embodiment.
Figure 12B:
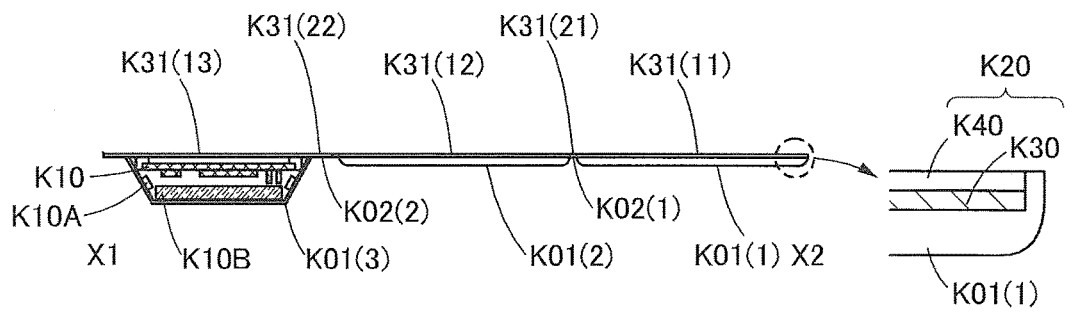
Figure 12C:
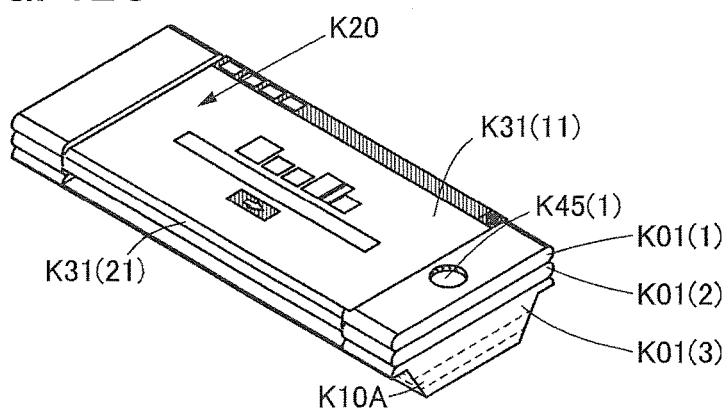

FIGS. 12A to 12C illustrate the information processing device in one embodiment of the present invention.

FIG. 12A is a projection view illustrating an input/output device K20 of an information processing device K100 in one embodiment of the present invention which is unfolded. FIG. 12B is a cross-sectional view of the information processing device K100 taken along line X1-X2 in FIG. 12A. FIG. 12C is a projection view illustrating the input/output device K20 which is folded.

<Structure Example of Information Processing Device>

The information processing device K100 described in this embodiment includes the input/output device K20, an arithmetic device K10, and housings K01(1) to K01(3) (see FIGS. 12A to 12C).

<<Input/Output Device>>

The input/output device K20 includes a display portion K30 and an input portion K40. The input/output device K20 is supplied with display information V and supplies sensing information S.

The display portion K30 is supplied with the display information V and the input portion K40 supplies the sensing information S (see FIG. 12B).

The input/output device K20, in which the input portion K40 and the display portion K30 integrally overlap with each other, serves not only as the display portion K30 but also as the input portion K40.

The input/output device K20 using a touch sensor as the input portion K40 and a display panel as the display portion K30 can be referred to as a touch panel.

<<Display Portion>>

The display portion K30 includes a region K31 where a first region K31(11), a first bendable region K31(21), a second region K31(12), a second bendable region K31(22), and a third region 1(31(13) are arranged in stripes in this order (see FIG. 12A).

The display portion K30 can be folded and unfolded along a first fold line formed in the first bendable region K31(21) and a second fold line formed in the second bendable region K31(22) (see FIGS. 12A and 12C).

<<Arithmetic Device>>

The arithmetic device K10 includes an arithmetic portion and a memory portion that stores a program to be executed by the arithmetic portion. The arithmetic device K10 supplies the display information V and is supplied with the sensing information S.

<<Housing>>

A housing includes the housing K01(1), a hinge K02(1), the housing K01(2), a hinge K02(2), and the housing K01(3) which are placed in this order.

In the housing K01(3), the arithmetic device K10 is stored. The housings K01(1) to K01(3) hold the input/output device K20, and enable the input/output device K20 to be folded and unfolded (see FIG. 12B).

In the example described in this embodiment, the information processing device has the three housings connected with one another with the two hinges. The information processing device having this structure can be folded with the input/output device K20 bent at two positions.

Note that n housings (n is a natural number of two or more) may be connected with one another with (n−1) hinges. The information processing device having this structure can be folded with the input/output device K20 bent at (n−1) positions.

The housing K01(1) overlaps with the first region K31(11) and a button K45(1).

The housing K01(2) overlaps with the second region K31(12).

The housing K01(3) overlaps with the third region K31(13) and stores the arithmetic device K10, an antenna K10A, and a battery K10B.

The hinge K02(1) overlaps with the first bendable region K31(21) and connects the housing K01(1) rotatably to the housing K01(2).

The hinge K02(2) overlaps with the second bendable region K31(22) and connects the housing K01(2) rotatably to the housing K01(3).

The antenna K10A is electrically connected to the arithmetic device K10 and supplies a signal or is supplied with a signal.

In addition, the antenna K10A is wirelessly supplied with power from an external device and supplies power to the battery K10B.

The battery K10B is electrically connected to the arithmetic device K10 and supplies power and is supplied with power.

<<Folding Sensor>>

A folding sensor K41 senses whether the housing is folded or unfolded and supplies information showing the state of the housing.

The arithmetic device K10 is supplied with information showing the state of the housing.

When the information showing the state of the housing is information showing the folded state, the arithmetic device K10 supplies the display information V including a first image to the first region K31(11) (see FIG. 12C).

When the information showing the state of the housing is information showing the unfolded state, the arithmetic device K10 supplies the display information V to the region K31 of the display portion K30 (see FIG. 12A).

Note that this embodiment can be combined with any of the other embodiments in this specification as appropriate.

(Embodiment 7)

In this embodiment, a structure of an information processing device of one embodiment of the present invention will be described with reference to FIGS. 13A1 to 13C2.

FIGS. 13A1 to 13C2 illustrate the information processing devices of embodiments of the present invention.

FIGS. 13A1 to 13A3 are projection views illustrating an information processing device of one embodiment of the present invention.

FIGS. 13B1 and 13B2 are projection views illustrating an information processing device of one embodiment of the present invention.

FIGS. 13C1 and 13C2 are a top view and a bottom view of an information processing device of one embodiment of the present invention.

<<Information Processing Device A>>

An information processing device 3000A includes an input/output portion 3120 and a housing 3101 supporting the input/output portion 3120 (see FIGS. 13A1 to 13A3).

The information processing device 3000A further includes an arithmetic portion, a memory portion storing a program that is executed by the arithmetic portion, and a power source such as a battery supplying power for driving the arithmetic portion.

Note that the housing 3101 stores the arithmetic portion, the memory portion, the battery, and the like.

The information processing device 3000A can display information on its side surface and/or top surface.

A user of the information processing device 3000A can supply operation instructions by using a finger in contact with the side surface and/or the top surface.

<<Information Processing Device B>>

An information processing device 3000B includes the input/output portion 3120 and an input/output portion 3120b (see FIGS. 13B 1 and 13B2).

The information processing device 3000B further includes the housing 3101 and a belt-shaped flexible housing 3101b that support the input/output portion 3120.

The information processing device 3000B further includes the housing 3101 supporting the input/output portion 3120b.

The information processing device 3000B further includes an arithmetic portion, a memory portion storing a program that is executed by the arithmetic portion, and a power source such as a battery supplying power for driving the arithmetic portion.

Note that the housing 3101 stores the arithmetic portion, the memory portion, the battery, and the like.

The information processing device 3000B can display information on the input/output portion 3120 supported by the housing 3101 and the belt-shaped flexible housing 3101b.

A user of the information processing device 3000B can supply operation instructions by using a finger in contact with the input/output portion 3120.

<<Information Processing Device C>>

An information processing device 3000C includes the input/output portion 3120 and the housings 3101 and 3101b supporting the input/output portion 3120 (see FIGS. 13C1 and 13C2).

The input/output portion 3120 and the housing 3101b have flexibility.

The information processing device 3000C further includes an arithmetic portion, a memory portion storing a program that is executed by the arithmetic portion, and a power source such as a battery supplying power for driving the arithmetic portion.

Note that the housing 3101 stores the arithmetic portion, the memory portion, the battery, and the like.

The information processing device 3000C can be folded in two at a portion of the housing 3101b.

This embodiment can be combined with any of the other embodiments in this specification as appropriate.

This application is based on Japanese Patent Application serial no. 2014-095195 filed with Japan Patent Office on May 2, 2014, the entire contents of which are hereby incorporated by reference.

What is claimed is:

1. An information processing device comprising:
an input portion; and
an arithmetic device,
wherein the arithmetic device is configured to be supplied with a map,
wherein the map includes a background map and a first map,
wherein the arithmetic device includes a memory portion storing a program for supplying predetermined instructions on the basis of the map and an arithmetic portion executing the program,
wherein the program includes a first step of executing interrupt processing and extracting a pattern, a second step of comparing the pattern with a reference table and proceeding to a third step when the pattern matches with a predetermined pattern and proceeding to the first step when the pattern does not match with the predetermined pattern, and the third step of supplying instructions associated with the predetermined pattern and proceeding to the first step, and
wherein the interrupt processing includes a fourth step of obtaining the background map and the first map and proceeding to a fifth step when the background map and the first map are different from each other and terminating the interrupt processing when the background map and the first map are not different from each other, the fifth step of performing a second map generation step of generating a second map on the basis of the background map and the first map, a sixth step of generating a binarization map on the basis of the second map, a seventh step of generating labeling data on the basis of the binarization map, an eighth step of generating or updating a data set on the basis of the labeling data, and a ninth step of extracting a pattern included in the data set.

2. The information processing device according to claim 1, wherein the second map generation step includes a tenth step of subtracting the background map from the first map, an eleventh step of generating a raised map by adding a same value, and a twelfth step of converting values over an upper limit in the raised map into the upper limit and converting values under a lower limit into the lower limit.

3. The information processing device according to claim 1, wherein the program includes a thirteenth step of supplying instructions associated with the predetermined pattern, a fourteenth step of generating a background map, and a fifteenth step of updating the background map and proceeding to the first step, instead of the third step.

4. The information processing device according to claim 1, wherein the program includes a thirteenth step of supplying instructions associated with the predetermined pattern, a fourteenth step of generating a background map, and a fifteenth step of updating the background map and proceeding to the first step, instead of the third step.

5. The information processing device according to claim 1,
wherein the input portion includes sensor units arranged in a matrix, a first control line electrically connected to a first group of sensor units arranged in a row direction, and a signal line electrically connected to a second group of sensor units arranged in a column direction, and
wherein the sensor unit includes a first switch whose control terminal is electrically connected to the first control line and whose first terminal is electrically connected to the signal line, an amplifying transistor whose first electrode is electrically connected to a second terminal of the first switch and whose second electrode is electrically connected to a first power supply line, a capacitor whose first electrode is electrically connected to a gate of the amplifying transistor and the conductive film and whose second electrode is electrically connected to a second control line, and a second switch whose first terminal is electrically connected to the gate of the amplifying transistor, whose control terminal is electrically connected to a third control line, and whose second terminal is electrically connected to a second power supply line.

6. The information processing device according to claim 2,
wherein the input portion includes sensor units arranged in a matrix, a first control line electrically connected to a first group of sensor units arranged in a row direction, and a signal line electrically connected to a second group of sensor units arranged in a column direction, and wherein the sensor unit includes a first switch whose control terminal is electrically connected to the first control line and whose first terminal is electrically connected to the signal line, an amplifying transistor whose first electrode is electrically connected to a second terminal of the first switch and whose second electrode is electrically connected to a first power supply line, a capacitor whose first electrode is electrically connected to a gate of the amplifying transistor and the conductive film and whose second electrode is electrically connected to a second control line, and a second switch whose first terminal is electrically connected to the gate of the amplifying transistor, whose control terminal is electrically connected to a third control line, and whose second terminal is electrically connected to a second power supply line.

7. The information processing device according to claim 3, wherein the input portion includes sensor units arranged in a matrix, a first control line electrically connected to a first group of sensor units arranged in a row direction, and a signal line electrically connected to a second group of sensor units arranged in a column direction, and wherein the sensor unit includes a first switch whose control terminal is electrically connected to the first control line and whose first terminal is electrically connected to the signal line, an amplifying transistor whose first electrode is electrically connected to a second terminal of the first switch and whose second electrode is electrically connected to a first power supply line, a capacitor whose first electrode is electrically connected to a gate of the amplifying transistor and the conductive film and whose second electrode is electrically connected to a second control line, and a second switch whose first terminal is electrically connected to the gate of the amplifying transistor, whose control terminal is electrically connected to a third control line, and whose second terminal is electrically connected to a second power supply line.

8. The information processing device according to claim 4, wherein the input portion includes sensor units arranged in a matrix, a first control line electrically connected to a first group of sensor units arranged in a row direction, and a signal line electrically connected to a second group of sensor units arranged in a column direction, and wherein the sensor unit includes a first switch whose control terminal is electrically connected to the first control line and whose first terminal is electrically connected to the signal line, an amplifying transistor whose first electrode is electrically connected to a second terminal of the first switch and whose second electrode is electrically connected to a first power supply line, a capacitor whose first electrode is electrically connected to a gate of the amplifying transistor and the conductive film and whose second electrode is electrically connected to a second control line, and a second switch whose first terminal is electrically connected to the gate of the amplifying transistor, whose control terminal is electrically connected to a third control line, and whose second terminal is electrically connected to a second power supply line.

9. The information processing device according to claim 1, wherein the input portion is folded or unfolded.

10. The information processing device according to claim 2, wherein the input portion is folded or unfolded.

11. The information processing device according to claim 1, wherein the binarization map comprises a plurality of cells, and wherein at the seventh step of generating the labeling data, a first label is given to a cell if a value of the cell is equal to a value of an adjacent cell.

12. The information processing device according to claim 11, wherein the plurality of cells comprises a second plurality of cells having the first label, wherein the second plurality of cells forms a region, and wherein positional data of the region is the center of the region.

* * * * *